US008605045B2

(12) United States Patent
Mamba et al.

(10) Patent No.: US 8,605,045 B2
(45) Date of Patent: Dec. 10, 2013

(54) TOUCH PANEL AND DISPLAY DEVICE USING THE SAME

(75) Inventors: Norio Mamba, Kawasaki (JP); Koji Nagata, Hachioji (JP); Shinji Sekiguchi, Chiba (JP); Koji Hayakawa, Chosei-gun (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 543 days.

(21) Appl. No.: 12/908,263

(22) Filed: Oct. 20, 2010

(65) Prior Publication Data

US 2011/0090175 A1   Apr. 21, 2011

(30) Foreign Application Priority Data

Oct. 21, 2009   (JP) ................................ 2009-242609

(51) Int. Cl.
*G09G 5/00* (2006.01)
(52) U.S. Cl.
USPC ......................................................... 345/173
(58) Field of Classification Search
USPC ................................................. 345/156–173
See application file for complete search history.

(56) References Cited

U.S. PATENT DOCUMENTS

| 7,030,860 | B1 | 4/2006 | Hsu et al. |
| 2003/0006971 | A1* | 1/2003 | Blanchard ..................... 345/173 |
| 2003/0006972 | A1* | 1/2003 | Blanchard ..................... 345/173 |
| 2004/0095332 | A1* | 5/2004 | Blanchard ..................... 345/173 |
| 2009/0002337 | A1* | 1/2009 | Chang ........................... 345/174 |
| 2009/0317592 | A1* | 12/2009 | Yoshitomi et al. ............ 428/142 |

FOREIGN PATENT DOCUMENTS

JP   2003-511799   3/2003

* cited by examiner

*Primary Examiner* — Viet Pham
(74) *Attorney, Agent, or Firm* — Antonelli, Terry, Stout & Kraus, LLP.

(57) ABSTRACT

Provided is a capacitive touch panel, including: a plurality of coordinate detection electrodes (XP1, XP2, YP2) for detecting X-Y position coordinates; a first substrate (1) including the plurality of coordinate detection electrodes; and a second substrate (6) disposed to be opposed to the first substrate, in which: one of the first substrate and the second substrate includes an elastic layer lower (5) in rigidity than the second substrate and a conductive layer (ZP) having conductivity; the elastic layer and the conductive layer are disposed between the plurality of coordinate detection electrodes and the second substrate; a space between the first substrate and the second substrate defined by a plurality of nonconductive spacers (4); and an antireflective layer is formed on at least one of an interface between the space and the first substrate and an interface between the space and the second substrate.

33 Claims, 13 Drawing Sheets

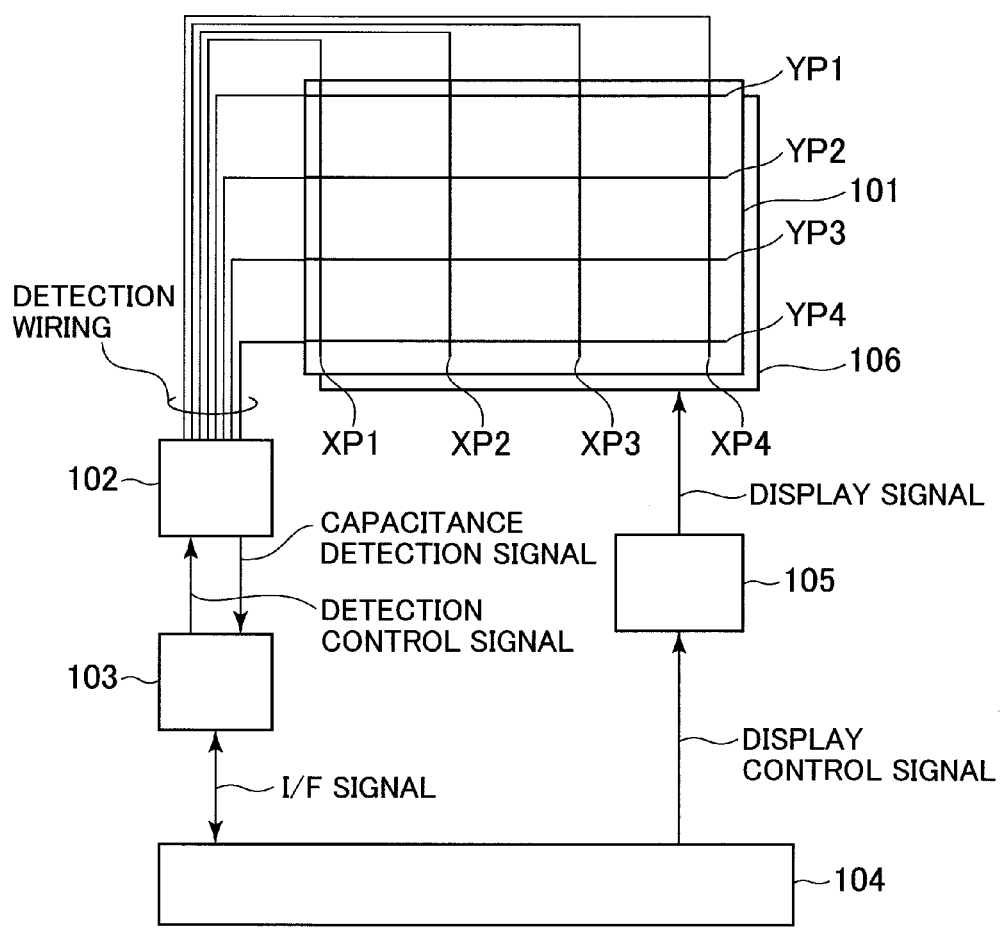
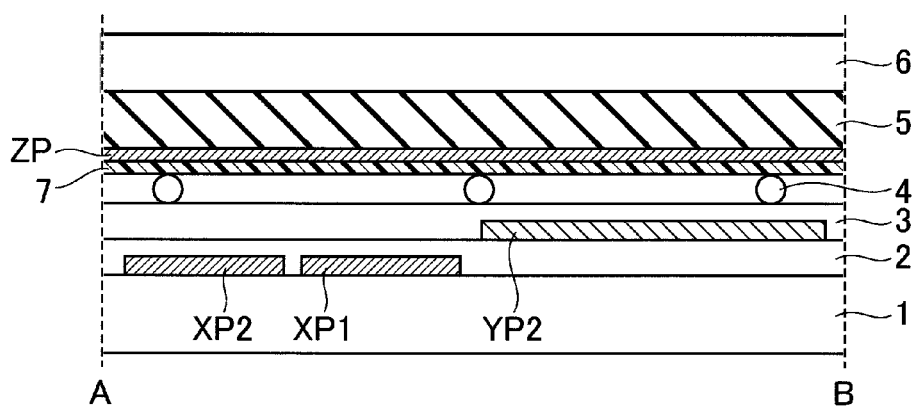

TOUCH PANEL AND DISPLAY DEVICE USING THE SAME

CROSS-REFERENCE TO RELATED APPLICATION

The present application claims priority from Japanese application JP 2009-242609 filed on Oct. 21, 2009, the content of which is hereby incorporated by reference into this application.

BACKGROUND OF THE INVENTION

1. Field of the Invention

The present invention relates to a touch panel for inputting coordinates on a screen and a display device using the same. In particular, the present invention relates to a technology for enabling an input of a touch panel of capacitive coupling type using such an insulator as a resin pen.

2. Description of the Related Art

A display device including an input device (hereinafter, also referred to as "touch sensor" or "touch panel") having an on-screen input function of inputting information to a display screen by a touch operation (contact and press operation, hereinafter, simply referred to as "touch") with a user's finger or the like is used for mobile electronic devices such as a PDA and a mobile terminal, various home electric appliances, a stationary customer guiding terminal such as an automatic reception machine, and the like. As the input device using the touch, there are known resistance film type of detecting a change in resistance value of a touched portion, capacitive coupling type of detecting a change in capacitance thereof, optical sensor type of detecting a change in amount of light at the portion shielded by the touch, and the like.

The capacitive coupling type has the following advantages when compared with the resistance film type or the optical sensor type. For example, a transmittance of the resistance film type or the optical sensor type is as low as 80%. On the other hand, a transmittance of the capacitive coupling type is as high as about 90%, thereby preventing a reduction in displayed image quality. In the resistance film type, a touch position is detected by mechanical contact to the resistance film, thereby leading to possible deterioration or breakage (crack) of the resistance film. On the other hand, in the capacitive coupling type, there is no mechanical contact such as contact of a detection electrode with another electrode. Thus, the capacitive coupling type is advantageous in durability.

An exemplary capacitive coupling type touch panel is disclosed in U.S. Pat. No. 7,030,860. In the capacitive coupling type touch panel disclosed therein, a vertical detection electrode (X electrode) and a horizontal detection electrode (Y electrode) are arranged in vertical and horizontal two-dimensional matrix, and a capacitance of each electrode is detected by an input processing part. When a conductor such as a finger touches a surface of the touch panel, the capacitance of each electrode increases. Thus, the input processing part detects the increase to calculate input coordinates based on a signal of a capacitance change detected by each electrode. Even when the detection electrode is deteriorated to change its resistance value as physical characteristics, such an influence on capacitance detection is limited. Thus, there is only a little influence on input position detection accuracy of the touch panel. As a result, high input position detection accuracy may be realized.

SUMMARY OF THE INVENTION

However, in the capacitive coupling type touch panel, as disclosed in U.S. Pat. No. 7,030,860, the input coordinates are detected by detecting a capacitance change in each electrode for detection, and hence a conductive material is supposed to be used as input means therefor. The conductive material may be typified by a human finger, and the capacitive coupling type touch panel is recognized as a finger input touch panel. Therefore, the capacitive touch panel has a problem that, in a case where a resin stylus, which is a nonconductive insulator used for a resistive touch panel or the like, is brought into contact with the capacitive coupling type touch panel, the capacitance change hardly occurs in the electrodes, and hence the input coordinates cannot be detected.

Alternatively, in a case where a stylus made of a conductive material such as metal is to be used for making an input to the capacitive coupling type touch panel, the number of electrodes needs to be increased. For example, a consideration is given to a case where a 4-inch capacitive coupling type touch panel with an aspect ratio of 3 to 4 is implemented by a rhombic electrode shape as disclosed in U.S. Pat. No. 7,030,860.

Here, when the touch panel is intended for a finger input, a smallest contact surface is assumed to be 6 mm in diameter. In order to provide the detection electrodes at intervals based on the diameter, 22 electrodes are necessary in total. On the other hand, a contact surface to be made by the stylus is assumed to be 1 mm in diameter. When the detection electrodes are formed at intervals based on the diameter of 1 mm, the number of the detection electrodes increases about 6-fold to 139. When the number of the electrodes increases, a frame area necessary for installing wiring to the input processing part increases. Further, the number of signal connection lines to a control circuit also increases, which leads to a reduction of reliability against impact or the like. The number of terminals of the input processing part also increases to increase a circuit area, which leads to a fear of cost increase. On the other hand, if a stylus having a tip end formed of a conductive rubber is used, the shape of the stylus needs to be 6 mm in diameter at a contact surface, provided that the number of the electrodes is unchanged, which brings an uncomfortable feeling in inputting characters.

The present invention has been made in view of the above-mentioned problems, and therefore, it is an object of the present invention to provide a capacitive touch panel capable of receiving an input made by an insulating material and a display device using the same.

Another object of the present invention is to provide a capacitive touch panel and a display device using the same, which are capable of preventing deterioration in image quality even when the touch panel is disposed on a display surface side of a display panel.

(1) In order to solve the above-mentioned problems, according to the present invention, there is provided a capacitive touch panel including: a plurality of coordinate detection electrodes for detecting X-Y position coordinates; a first substrate including the plurality of coordinate detection electrodes; a second substrate disposed to be opposed to the first substrate, in which: the second substrate includes, on the first substrate side, an elastic layer that is lower in rigidity than the second substrate and a conductive layer having conductivity; the plurality of coordinate detection electrodes and the conductive layer sandwich a plurality of nonconductive spacers formed at intervals in a plane direction of the first substrate and the second substrate; and the capacitive touch panel further includes an antireflective layer formed on at least one of an interface between the first substrate and a space defined by the plurality of nonconductive spacers and an interface between the second substrate and the space defined by the plurality of nonconductive spacers.

(2) In order to solve the above-mentioned problems, according to the present invention, there is provided a capacitive touch panel including a first substrate and a second substrate which are disposed to be opposed to each other across a plurality of nonconductive spacers, in which: the first substrate includes: first signal lines each extending in a direction of a y-axis and being arranged in parallel with one another in a direction of an x-axis; second signal lines each extending in the direction of the x-axis and being arranged in parallel with one another in the direction of the y-axis; a first coordinate detection electrode that is formed in an area divided by the first signal lines and the second signal lines, and connected to the one of the first signal lines; and a second coordinate detection electrode that is formed in the same layer as the first coordinate detection electrode, and connected to the one of the second signal lines, the first substrate includes an elastic layer that is lower in rigidity than the second substrate and a conductive layer having conductivity, the elastic layer and the conductive layer being formed closer to an opposed surface of the first substrate with respect to the first coordinate detection electrode and the second coordinate detection electrode; and the capacitive touch panel further includes an antireflective layer formed on at least one of an interface between the first substrate and a space defined by the plurality of nonconductive spacers and an interface between the second substrate and the space defined by the plurality of nonconductive spacers.

(3) In order to solve the above-mentioned problems, according to the present invention, there is provided a capacitive touch panel including: a first substrate; a coordinate detection electrode for detecting X-Y position coordinates, the coordinate detection electrode being provided on the first substrate; and a second substrate disposed to be opposed to the first substrate, in which: the first substrate includes an elastic layer that is lower in rigidity than the second substrate and a conductive layer having conductivity, the elastic layer and the conductive layer being formed closer to the second substrate with respect to the coordinate detection electrode; the second substrate and the conductive layer sandwich a plurality of nonconductive spacers formed at intervals in a plane direction of the first substrate and the second substrate; and the capacitive touch panel further includes an antireflective layer formed on at least one of an interface between the first substrate and a space defined by the plurality of nonconductive spacers and an interface between the second substrate and the space defined by the plurality of nonconductive spacers.

(4) In order to solve the above-mentioned problems, according to the present invention, there is provided a display device including a display panel including a display portion, and the capacitive touch panel according to any one of Items (1) to (3) which is disposed on a display surface side of the display panel.

According to the present invention, an insulating body such as a resin pen may be used, in addition to a finger, to make an input to a capacitive touch panel. Further, even when the touch panel and a display panel are laminated, an image quality in the display device may be improved.

Other effects of the present invention become apparent from the entire description of the specification.

BRIEF DESCRIPTION OF THE DRAWINGS

In the accompanying drawings:

FIG. 1 is a system configuration diagram for illustrating a schematic configuration of a display device according to a first embodiment of the present invention;

FIG. 2 is a sectional view illustrating an electrode structure of a touch panel of the display device according to the first embodiment of the present invention;

DETAILED DESCRIPTION OF THE INVENTION

Figure 3:
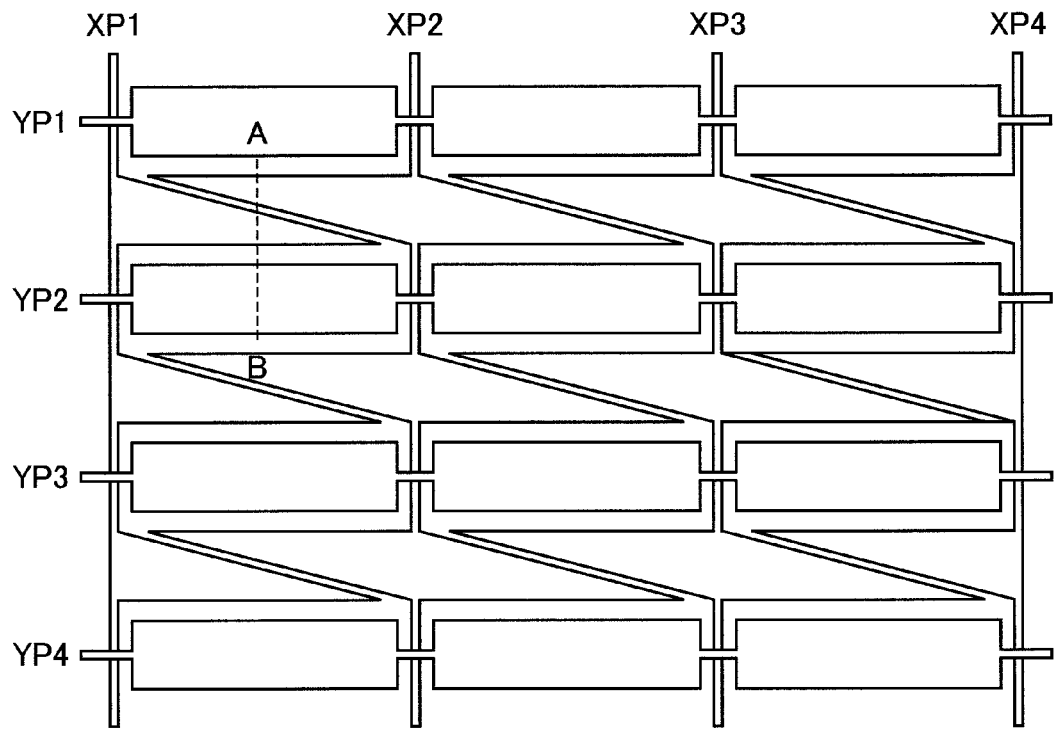
FIG. 3 is a plan view illustrating the electrode structure of the touch panel of the display device according to the first embodiment of the present invention.

Hereinafter, embodiments to which the present invention is applied are described with reference to the accompanying drawings. It should be noted that, in the following description, the same components are denoted by the same reference symbols so that repetitive description thereof is omitted.

First Embodiment

FIG. 1 is a system configuration diagram for illustrating a schematic configuration of a display device according to a first embodiment of the present invention. In the following, with reference to FIG. 1, an overall configuration of the display device according to the first embodiment is described.

FIG. 1 illustrates a touch panel 101 of capacitive type (more specifically, capacitive coupling type), which serves as an input device for use in the display device according to the first embodiment of the present invention. The touch panel 101 includes X electrodes XP and Y electrodes YP for capacitance detection. The first embodiment is described as an exemplary case where, for example, four X electrodes (XP1 to XP4) and four Y electrodes (YP1 to YP4) are provided. However, each of the numbers of the X electrodes and the Y electrodes is not limited to four. The touch panel 101 is disposed on a front surface of a display panel 106. Accordingly, in the display device according to the first embodiment, when an image displayed on the display panel 106 is viewed by a user, the image displayed on the display panel 106 needs to pass through the touch panel 101, and hence the touch panel 101 is expected to have a high transmittance. Note that, the display panel 106 may employ a known display panel such as a liquid crystal display panel or an organic electroluminescence (EL) display panel.

The X electrodes XP and the Y electrodes YP of the touch panel 101 are connected to a capacitance detection part 102 via detection wiring. The capacitance detection part 102, which is controlled based on a detection control signal output from an arithmetic control part 103, detects a capacitance of each of the electrodes (X electrodes XP, Y electrodes YP) included in the touch panel 101, and outputs, to the arithmetic control part 103, a capacitance detection signal which varies depending on the capacitance value of each electrode. The arithmetic control part 103 calculates, based on the capacitance detection signal for each electrode, a signal component for each electrode, and obtains through calculation the input coordinates based on the signal component for each electrode. When the input coordinates are transferred from the arithmetic control part 103 to a system 104 in response to a touch operation, the system 104 generates a display image corresponding to the touch operation, and transfers the display image as a display control signal to a display control circuit 105. The display control circuit 105 generates a display signal, based on the display image transferred as the display control signal, and displays an image on the display panel 106.

Next, FIG. 2 is a sectional view illustrating an electrode structure of the touch panel 101 of the display device according to the first embodiment of the present invention, and FIG. 3 is a plan view illustrating the electrode structure of the touch panel 101 of the display device according to the first embodiment of the present invention. In the following, with reference to FIGS. 2 and 3, a configuration of the touch panel 101 according to the first embodiment is described. Here, the sectional view illustrated in FIG. 2 is taken along the line A-B of FIG. 3. The sectional view of FIG. 2 illustrates only the layers that are necessary for describing the operation of the touch panel 101. Further, FIG. 2 illustrates first and second transparent substrates 1 and 6, first and second transparent insulating films 2 and 3, spacers 4, a transparent elastic layer 5, an antireflective film 7, and detection electrodes XP, YP, and ZP. Further, each of these thin film layers of the first embodiment may be formed through known photolithography, and hence detailed description of a method of forming each of the thin film layers is omitted.

As is apparent from FIG. 2, the touch panel 101 according to the first embodiment of the present invention has a configuration in which the X electrode (transparent conductive film) XP, the first transparent insulating film 2, the Y electrode (transparent conductive film) YP, the second transparent insulating film 3, the spacers 4 for providing a space with respect to the Z electrode ZP, the antireflective film 7 including one or a plurality of layers, the Z electrode ZP, and the elastic layer 5 are sequentially laminated on the first transparent substrate 1, with the second transparent substrate 6 being laminated on top thereof. In other words, in the touch panel 101 according to the first embodiment, the first transparent substrate (first substrate) 1 and the second transparent substrate (second substrate) 6 are disposed to be opposed to each other across the spacers 4. In the configuration, on the opposed surface side of the first transparent substrate 1, the X electrode (transparent conductive film) XP, the first transparent insulating film 2, the Y electrode (transparent conductive film) YP, and the second transparent insulating film 3 are sequentially laminated. Further, on the opposed surface side of the second transparent substrate 6, the elastic layer 5, the Z electrode ZP, and the antireflective film 7 including one or a plurality of layers are sequentially laminated. Accordingly, in the touch panel 101 according to the first embodiment, the second insulating film 3 formed above the first transparent substrate 1 is in contact with the spacers 4. Further, the antireflective film 7 formed above the second transparent substrate 6 is in contact with the spacers 4.

As described above, the touch panel 101 according to the first embodiment of the present invention includes the antireflective film 7 which is formed in order to suppress light reflected off an interface between the Z electrode ZP and the air layer. With this configuration, the touch panel 101 is increased in transmittance, allowing a display image to be displayed with a high luminance even in a display device configured by including the touch panel 101 of the first embodiment disposed on the display surface side of the display panel 106. Further, generation of reflected light due to external light entering from an operation surface side of the touch panel 101 to be reflected off the interface between the Z electrode ZP and the air layer may be significantly reduced, and hence a display of high contrast may be attained even in a case where the touch panel 101 is disposed on the display panel 106.

Further, the X electrodes XP and the Y electrodes YP of the touch panel 101 of the first embodiment are connected to the capacitance detection part 102 via the detection wiring. As is apparent from FIG. 3, the Y electrodes YP each extend in a lateral direction (direction of the x-axis) of the touch panel 101, and a plurality of the Y electrodes YP are arranged in parallel with one another in a longitudinal direction (direction of the y-axis) of the touch panel 101. At a point of intersection between each of the Y electrodes YP and each of the X electrodes XP, the Y electrode YP and the X electrode XP are each reduced in width, to thereby reduce the cross-over capacitance of the electrodes. This point is provisionally referred to as thin line portion. Accordingly, the Y electrodes YP each have the thin line portions and electrode portions (hereinafter, referred to as pad portions) other than the thin line portions, which are alternately arranged in the extending direction thereof. Each of the X electrodes XP is arranged between the adjacent Y electrodes YP. The X electrodes XP each extend in the longitudinal direction (direction of the y-axis) of the touch panel 101, and a plurality of the X electrodes XP are arranged in parallel with one another in the lateral direction (direction of the x-axis) of the touch panel 101. Similarly to the Y electrodes YP, the X electrodes XP each have the thin line portions and the pad portions, which are alternately arranged in the extending direction thereof.

Next, the shape of the pad portion of the X electrode is described, assuming that a wiring position for connecting the X electrode to the detection wiring (or the thin line portion of the X electrode) is the center of the X electrode in the lateral direction. The pad portion of the X electrode has an electrode shape such that the area thereof becomes smaller as being closer to the center of the adjacent X electrode, while becoming larger as being closer to the center of the X electrode concerned. Therefore, considering an area of the X electrode between two adjacent X electrodes, e.g., an area between XP1 and XP2, the electrode area of the pad portion of the XP1 electrode becomes maximum while the electrode area of the pad portion of the XP2 electrode becomes minimum at the middle portion of the XP1 electrode. In contrast, at the middle portion of the XP2 electrode, the electrode area of the pad portion of the XP1 electrode becomes minimum while the electrode area of the pad portion of the XP2 electrode becomes maximum.

Next, with reference to FIGS. 2 and 3, the layer structure of the touch panel 101 is described in order of from the nearest layer to the farthest layer with respect to the first transparent substrate 1. The material, the thickness, and the like to be used for the first transparent substrate 1 are not particularly limited and, depending on the application and use thereof, the first transparent substrate 1 is preferably selected from materials including inorganic glass such as barium borosilicate glass and soda glass, chemically strengthened glass, and resin films such as polyether sulfone (PES), polysulfone (PSF), polycarbonate (PC), polyarylate (PAR), and polyethylene terephthalate (PET). Further, the electrodes to be used for XP and YP are a transparent conductive film, which is not particularly limited as long as the electrode is a conductive thin film. Conventional examples which may be used include indium tin oxide (ITO), antimony tin oxide (ATO), and indium zinc oxide (IZO).

The transparent conductive film (having a thickness of 50 Å to 200 Å) is formed to have a surface resistance of 500Ω to 2,000Ω, using a sputtering method, and patterning is conducted using an exposure and developing process after application of the resist material. Here, the resist material may be any one of positive and negative type, and an alkaline developable material may be easy to use for forming the resist material. After that, ITO is patterned to be formed by etching. Here, the etchant to be used is preferably selected from an aqueous hydrobromic acid solution or the like.

The X electrode XP is formed at a portion close to the first transparent substrate 1, and then the first insulating film 2 is formed on the upper layer of the X electrode XP for insulating the X electrode XP and the Y electrode YP from each other. Next, the Y electrode YP is formed on the upper layer of the first insulating film 2. After the Y electrode YP is formed, the second insulating film 3 is positioned on the upper layer of the Y electrode YP, thereby achieving rigidity and conductivity of the detection electrodes. Here, the order of the X electrode XP and the Y electrode YP may be exchanged.

The first insulating film 2 and the second insulating film 3 may be varied in film thickness depending on the permittivity of the insulating film material. The first insulating film 2 and the second insulating film 3 may easily be adjusted to have a relative permittivity of 2 to 4, and each may be formed in a film thickness of 1 μm to 20 μm. The insulating film layer may be formed of a material such as an ultraviolet (UV) curable resin material, an alkaline developable insulating film material of negative type or positive type, or a thermosetting resin material curable by heat. Here, the alkaline developable material may be easy to use for forming the insulating film.

The spacers 4 may be formed by dispersing, as appropriate, polymeric beads, glass beads, or the like, which are uniform in grain size. When using beads for forming the spacers 4, the grain size of the beads for defining a distance between the second insulating film 3 formed above the first substrate 1 and the antireflective film 7 may be selectively set to fall within a range of 5 μm to 100 μm, and may preferably be in a range of 20 μm to 50 μm. The beads may be dispersed at a density capable of providing a space of equal to or larger than 20 μm and equal to or smaller than 10,000 μm, between the adjacent beads. The spacer 4 may not be limited to the polymeric beads or the glass beads, and may be formed as dotted columnar spacers which are each made of a photo-curable resin material. When employing the columnar spacers as the spacers 4, the columnar spacers may preferably be formed through screen printing or the like at intervals of equal to or larger than 20 μm and equal to or smaller than 10,000 μm. The columnar spacers may be formed in any shape freely selected from, for example, a circular shape and a rectangular shape, and have a diameter falling within a range of 5 μm to 100 μm, which may preferably be in a range of 20 μm to 50 μm. When employing the columnar spacers as the spacers 4, the spacers 4 are formed as protrusions on at least one of the first transparent substrate 1 side and the second transparent substrate 6 side.

The antireflective film 7 prevents, by using interference of light, reflected light from entering the air layer held by the spacers 4. As a result, the touch panel 101 is increased in transmittance, to thereby allow an image from the display panel 106 to be displayed with a higher luminance. The reflection of external light (such as sunlight) in the touch panel 101 may also be reduced by the antireflective film 7, to thereby display an image in high contrast. Note that, the touch panel 101 of the first embodiment employs a system of detecting a capacitance change that occurs between the transparent electrodes XP and the Z electrode ZP and between the transparent electrodes YP and the Z electrode ZP, and hence a touch operation may be detected even when an insulating material such as the antireflective film 7 is formed between the transparent electrodes XP and YP and the Z electrode ZP.

Further, the antireflective film 7 is formed of an antireflective laminated body, which may preferably include at least one high refractive thin film layer and at least one low refractive thin film layer which are alternately laminated. The antireflective film 7 with this configuration may be formed of an organic material, an inorganic material, or a combination of an organic material and an inorganic material.

Examples of the inorganic material which may be used for the high refractive thin film layer include niobium oxide, titanium oxide, indium oxide, tin oxide, zinc oxide, zirconium oxide, tantalum oxide, hafnium oxide, and a mixture thereof. Of those, niobium oxide and titanium oxide are particularly suitable for the material. When the high refractive thin film layer is formed by a sputtering method, niobium oxide is more suitable for the material because of a small number of pinholes in the thin film.

In addition, examples of the inorganic material which may be used for the low refractive thin film layer include low refractive materials such as silicon oxide, titanium nitride, magnesium fluoride, barium fluoride, calcium fluoride, hafnium fluoride, and lanthanum fluoride. Of those, silicon oxide is particularly suitable for the material for forming the low refractive thin film layer in terms of its optical properties, mechanical strength, film formability, cost, and the like. Those antireflective laminated bodies may be formed by a dry coating method such as a sputtering method, an evaporation method, and a chemical vapor deposition (CVD) method. In particular, the sputtering method may form a dense film, which makes the resultant antireflective laminated body excellent in mechanical properties including abrasion resistance.

On the other hand, when the high refractive thin film layer is formed of the organic material, a curable composition used for the material is not particularly limited. However, the material preferably contains one kind or a combination of two or more kinds of an epoxy-based resin, a phenol-based resin, a melamine-based resin, an alkyd-based resin, a cyanate-based resin, an acrylic-based resin, a polyester-based resin, an urethane-based resin, a siloxane resin, and the like as a component for forming a coating. This is because those resins may form a strong thin film as the high refractive layer, and consequently, abrasion resistance of the antireflective film may be remarkably improved. Further, it is more preferred that inorganic particles having a high refractive index, for example, metal oxide particles be incorporated. In addition, as the cured form, a composition curable by thermal curing, ultraviolet curing, or electron radiation curing may be used, and more preferably used one is an ultraviolet curable composition, which has good productivity. As the material for the low refractive layer of the antireflective film, a fluororesin-based coating material which contains a fluorine-containing polymer having a hydroxyl group is preferably used, for example.

The Z electrode ZP formed under the antireflective film 7 is a transparent conductive film, and is not particularly limited as long as it is a thin film having conductivity, and conventional indium tin oxide (ITO), antimony tin oxide (ATO), and indium zinc oxide (IZO) may be used. The transparent conductive film is formed into a film by a sputtering method so that the surface resistance may be 500Ω to 2,000Ω, and patterned into a shape corresponding to the X and Y electrodes by an exposure and developing process after application of a resist material. In this case, any of a positive-type and a negative-type resist material may be used as the resist material, and an alkaline developable resist material may be readily formed. After that, ITO is patterned by etching. An aqueous hydrobromic acid solution or the like may be selected as the etchant in this case. In addition, when the Z electrode ZP is formed so that the surface resistance may be 10,000Ω to 10,000,000Ω, patterning becomes unnecessary. As a result, in addition to a thin film obtained by dispersing fine particles of conventional indium tin oxide (ITO), antimony tin oxide (ATO), indium zinc oxide (IZO), or the like into a transparent resin, a thin film obtained by dispersing conductive fine particles, for example, metal fine particles made of nickel, gold, silver, copper, or the like, insulating inorganic fine particles, or resin fine particles coated with metal into a resin and the like may be used. Further, fine particles made of at least one kind of metal oxide selected from the group consisting of $Al_2O_3$, $Bi_2O_3$, $CeO_2$, $In_2O_3$, $(In_2O_3.SnO_2)$ $HfO_2$, $La_2O_3$, $MgF_2$, $Sb_2O_5$, $(Sb_2O_5.SnO_2)$, $SiO_2$, $SnO_2$, $TiO_2$, $Y_2O_3$, ZnO, and ZrO, or metal fluoride may be used by dispersing into a transparent resin. In addition, organic conductive materials such as polyaniline, polyacetylene, polyethylene dioxythiophene, polypyrrole, polyisothianaphthene, polyisonaphthothiophene may also be used by being applied. Further, materials having low optical absorption and scattering as a result of optical refractive index and optical reflection are preferred for the Z electrode, and preferably appropriately selected. In addition, the Z electrode ZP may be obtained by forming non-conductive layer having a higher rigidity than the transparent elastic layer 5, and laminating them. The non-conductive layer may be formed on the first substrate side of the Z electrode ZP and the Z electrode ZP may be formed on the first substrate side of the non-conductive layer. In this case, the non-conductive layer having a higher rigidity than the transparent elastic layer 5 is preferably a resin film such as polyether sulfone (PES), polysulfone (PSF), polycarbonate (PC), polyallylate (PAR), and polyethylene terephthalate (PET).

The transparent elastic layer 5, which is formed under the Z electrode ZP, is an elastic rubber-like layer, and is not particularly preferably limited as long as it has elasticity. However, a material which is transparent in a visible light range is preferred for the purpose of improving transmittance. Examples of the material include butyl rubber, fluorocarbon rubber, ethylene-propylene-diene monomer rubber (EPDM), acrylonitrile-butadiene rubber (NBR), chloroprene rubber (CR), natural rubber (NR), isoprene rubber (IR), styrene-butadiene rubber (SBR), butadiene rubber, ethylene-propylene rubber, silicone rubber, polyurethane rubber, polynorbornene rubber, styrene-butadiene-styrene rubber, epichlorohydrin rubber, hydrogenated NBR, polysulfide rubber, and urethane rubber. The rubbers may be used alone, or two or more kinds of them may be used in combination. The transparent elastic layer 5 is preferably formed so that its film thickness may be thicker than the diameter of the spacer 4, preferably 5 μm or more, so as to be deformed sufficiently by pressure. It should be noted that the Z electrode ZP and the transparent elastic layer 5 may be formed of one common layer.

The material to be used for the second transparent substrate 6 is not limited to a particular material. However, because it is necessary to transmit the compression force of the pressing to the transparent elastic layer 5, it is not preferable to use inorganic glass such as barium borosilicate glass or soda glass, or chemically strengthened glass. It is preferable to select the material of the second transparent substrate 1 from resins having elasticity such as polyether sulfone (PES), polysulfone (PSF), polycarbonate (PC), polyarylate (PAR), and polyethylene terephthalate (PET), and a material consisting of the resin and additional elastomer component for improving the elasticity. In addition, in order to satisfy the above-mentioned elasticity, it is preferable that the thickness of the second transparent substrate 6 be 800 µm or smaller. Further, if a substrate in a thickness equal to or smaller than 100 µm is used as the second transparent substrate 6, the substrate is subject to a large amount of deformation under a heavy load, which leaves the interface between the second transparent substrate 6 and the transparent elastic layer 5 susceptible to peeling. Accordingly, the thickness of the second transparent substrate 6 may preferably be equal to or larger than 100 µm.

Figure 4:
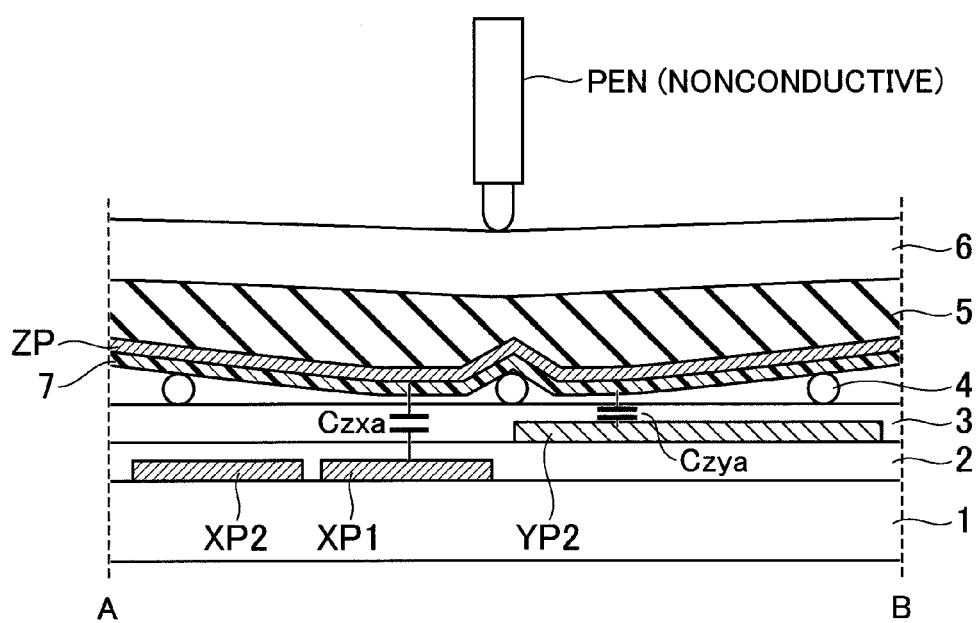
FIG. 4 is a view for illustrating a capacitance change that occurs in the touch panel of the display device according to the first embodiment of the present invention when an input is made thereto with a resin pen.
Figure 5:
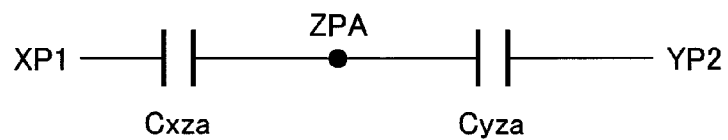
FIG. 5 illustrates an equivalent circuit of the touch panel when touched, of the display device according to the first embodiment of the present invention.
Figure 6:
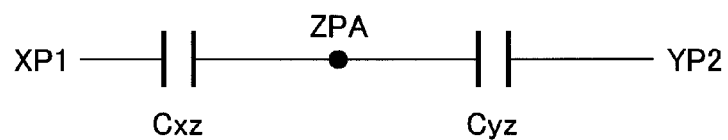
FIG. 6 illustrates an equivalent circuit of the touch panel when untouched, of the display device according to the first embodiment of the present invention.

Next, FIG. 4 is a view for illustrating a capacitance change that occurs in the touch panel 101 of the display device according to the first embodiment of the present invention when an input is made thereto with a resin pen, FIG. 5 illustrates an equivalent circuit of the touch panel 101 when touched, of the display device according to the first embodiment of the present invention, and FIG. 6 illustrates an equivalent circuit of the touch panel 101 when untouched, of the display device according to the first embodiment of the present invention. In the following, with reference to FIGS. 4 to 6, a capacitance change that occurs in response to a touch operation made to the touch panel 101 of the display device according to the first embodiment of the present invention is described. In particular, FIG. 4 is a schematic view for illustrating a capacitance change that occurs in a case where nonconductive input means is used for making a touch operation, and a distance from the X electrode XP to the Z electrode ZP and a distance from the Y electrode YP to the Z electrode ZP are changed due to a pressure applied when the touch panel 101 is touched. Further, the following description may similarly be applied to a case where the distance from the X electrode XP to the Z electrode ZP and the distance from the Y electrode YP to the Z electrode ZP are changed due to a pressure applied through conductive input means (such as finger).

The capacitance between the X electrode XP and the Y electrode YP adjacent to each other corresponds to an inter-electrode capacitance (not shown) between the X electrode and the Y electrode through the insulating film, and a combined capacitance such as a parallel plate capacitance formed by the Z electrode ZP with respect to each of the X electrode XP and the Y electrode YP. Here, a capacitance between the X electrode (XP1) and the Z electrode ZP and a capacitance between the Y electrode (YP2) and the Z electrode ZP without a touch operation are defined as Czx (not shown) and Czy (not shown), respectively.

As illustrated in FIG. 4, in a case where the Z electrode ZP is pressed down due to a pressure applied by a touch, the distances from the Z electrode ZP to each of the X electrode XP and the Y electrode YP are reduced, and hence the parallel plate capacitances thereof increase. Here, when the capacitance between the X electrode XP1 and the Z electrode ZP and the capacitance between the Y electrode YP2 and the Z electrode ZP with a touch operation are defined as Czxa and Czya, respectively, these capacitances are expressed by Relational Expressions (1) and (2) below.

$$Czxa > Czx \quad \text{Expression (1)}$$

$$Czya > Czy \quad \text{Expression (2)}$$

The Z electrode ZP is a floating electrode, and hence the combined capacitances with or without a touch operation are each assumed to be a series capacitance as illustrated in FIGS. 5 and 6. Accordingly, a capacitance change ΔC to occur between the X electrode XP and the Y electrode YP adjacent to each other depending on whether or not a touch operation is made is expressed by Expression (3) below.

$$\{Czxa \cdot Czx \cdot (Czya-Czy)+Czya \cdot Czy \cdot (Czxa-Czx)\}/\{(Czx+Czy) \cdot (Czxa+Czya)\} \quad \text{Expression (3)}$$

The capacitance detection part 102 detects a capacitance of each electrode, or a capacitance change that occurs depending on whether or not a touch operation is made, which is expressed by Expression (3). The arithmetic control part 103 calculates the coordinates of the input when the touch operation is made, by using, as a signal component, the capacitance of each electrode or the capacitance change obtained by the capacitance detection part 102.

According to the description given above, even when the input is made with nonconductive input means, the input coordinates may be detected based on the capacitance change that occurs when the distance from the X electrode XP to the Z electrode ZP and the distance from the Y electrode YP to the Z electrode ZP are changed due to the pressure applied by the input. Accordingly, the touch panel 101 according to the first embodiment may be configured as an input device responsive to a pressure applied by using nonconductive input means.

Figure 7:
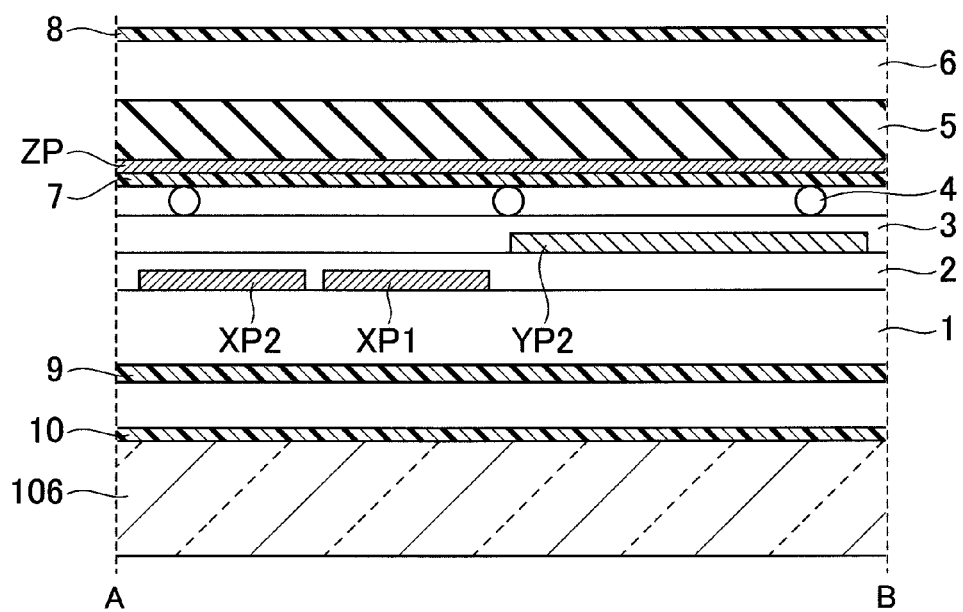
FIG. 7 is a sectional view for illustrating a first variation of a laminated structure of the touch panel and a display panel of the display device according to the first embodiment of the present invention.

FIG. 7 is a sectional view for illustrating a first variation of a laminated structure of the touch panel 101 and the display panel 106 in the display device according to the first embodiment of the present invention. In particular, FIG. 7 illustrates a laminated structure employed when a space (air layer) is provided between the touch panel 101 and the display panel 106.

As is apparent from FIG. 7, when a space (air layer) is provided between the touch panel 101 and the display panel 106, an antireflective film is also formed for preventing reflection occurring at an interface between the air layer and each of the touch panel 101 and the display panel 106. Specifically, an antireflective film 8 is formed for preventing reflection at the interface between an air layer and the second transparent substrate 6, an antireflective film 9 is formed for preventing reflection at the interface between the air layer and the first transparent substrate 1, and an antireflective film 10 is formed for preventing reflection at the interface between the air layer and the display panel 106. With this configuration, the touch panel 101 may further be increased in transmittance, while suppressing external light reflection. Note that, while three antireflective films 8, 9, and 10 are formed in the display device of FIG. 7, the combination of the three antireflective films is not limited thereto, and one of the antireflective films or a combination of two of the antireflective films may also be used.

Figure 8:
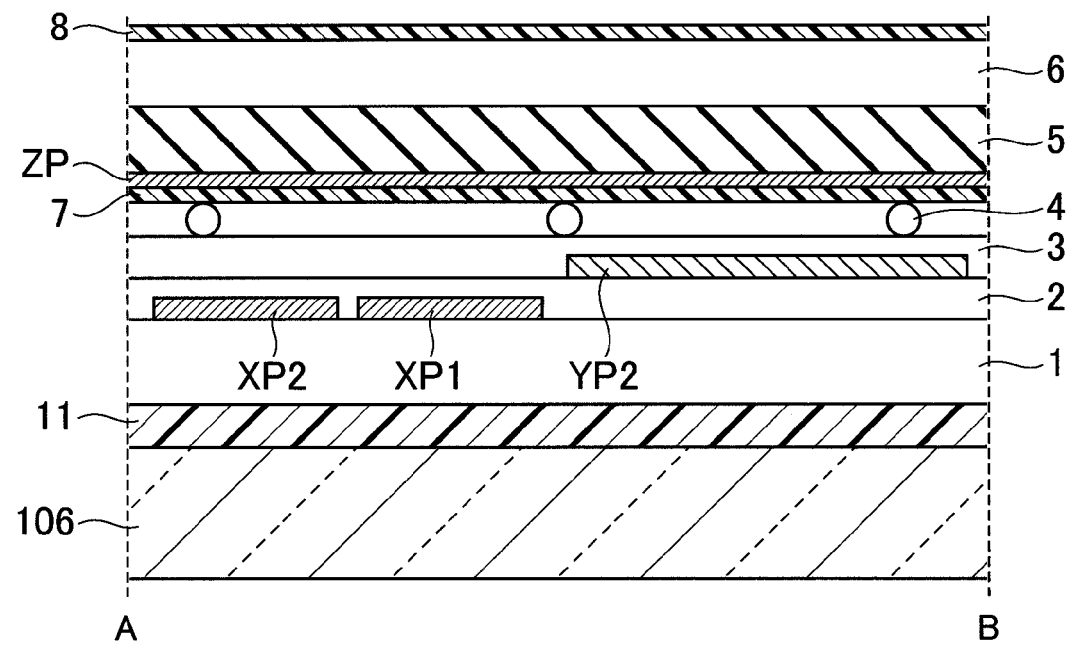
FIG. 8 is a sectional view for illustrating a second variation of the laminated structure of the touch panel and the display panel of the display device according to the first embodiment of the present invention.

FIG. 8 is a sectional view for illustrating a second variation of the laminated structure of the touch panel 101 and the display panel 106 in the display device according to the first embodiment of the present invention. In particular, FIG. 8 illustrates a laminated structure employed when an adhesion layer 11 is used to closely bond the touch panel 101 and the display panel 106. For forming the adhesion layer 11 to be configured as described above, an adhesive resin material selected from materials which may be formed in a thickness of equal to or larger than 100 µm in a single layer may be applied, or a resin adhesive sheet selected from resin adhesive sheets in a thickness of equal to or larger than 100 µm in a single layer may be attached, to thereby form the adhesion layer 11.

Examples of the adhesive resin material to be applied include, for example, a silicon resin, a polyurethane resin, an epoxy resin, a polyester resin, and an acrylic resin. Of these, the acrylic resin having adhesiveness may be preferred in terms of transparency, low cost (high in versatility), and durability, such as heat resistance, moist heat resistance, and light resistance.

The application method in this step is not particularly limited as long as the coating solution may be uniformly applied, and methods such as bar coating, blade coating, spin coating, die coating, slit reverse coating, three-roll reverse coating, comma coating, roll coating, and dip coating may be used.

The coating film is preferably applied so that the thickness of the film may be 100 μm to 1,500 μm, or more preferably 500 μm to 1,000 μm.

After the above-mentioned application step, in order to polymerize photopolymerizable monomers contained in the above-mentioned resin material coating solution applied by the above-mentioned application step, the photopolymerizable monomers are irradiated with ultraviolet light at an irradiance of 1 mW/cm$^2$ or more and less than 100 mW/cm$^2$ for 10 to 180 seconds.

Examples of the sheet-shaped pressure-sensitive adhesive material having adhesiveness include an acrylic pressure-sensitive adhesive material, a vinyl acetate-based pressure-sensitive adhesive material, an urethane-based pressure-sensitive adhesive material, an epoxy resin, a vinylidene chloride-based resin, a polyamide-based resin, a polyester-based resin, synthetic rubber-based pressure-sensitive adhesive material, and a silicon-based resin. Of those, the acrylic pressure-sensitive adhesive material and the silicon-based resin, which have high transparency, are preferred. Further, the silicon-based resin is preferred in terms of shock eliminating function.

The adhesion layer 11 eliminates the interfaces between the first transparent substrate 1 and the air layer and between the display panel 106 and the air layer in the configuration illustrated in FIG. 7. In this case, the antireflective film 8 may be formed at the interface between the second transparent substrate 6 and the air layer, to thereby increase the transmittance of the touch panel 101 while alleviating external light reflection.

As described above, in the capacitive touch panel 101 of the display device according to the first and second variations (illustrated in FIGS. 7 and 8) of the first embodiment of the present invention, the antireflective film 8 is formed as an upper layer on the second transparent substrate 6 on a side to be touched by an operator, and the first transparent substrate 1 and the second transparent substrate 6 are disposed to be opposed to each other across the spacers 4 so that the antireflective film 8 is disposed on an operation surface side, to thereby form the touch panel 101.

Further, when displaying an image from the display panel 106 disposed on the first transparent substrate 1 side, reflection occurring between the first substrate 1 and the display panel 106 may be suppressed, with the result that the display quality of the image may be improved.

Here, in the touch panel 101 of the display device according to the first embodiment illustrated in FIGS. 7 and 8, the antireflective film 8 is formed of an antireflective laminated body which includes at least one high refractive thin film layer and at least one low refractive thin film layer which are alternately laminated, and hence reflection at the interface between the air layer and the second transparent substrate 6 may be significantly reduced.

Second Embodiment

Figure 9:
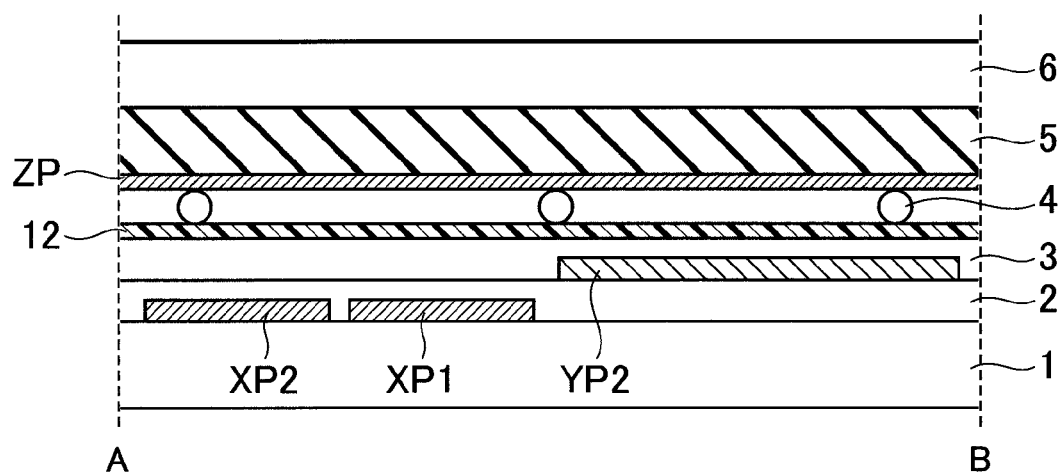
FIG. 9 is a sectional view illustrating an electrode structure of a touch panel of a display device according to a second embodiment of the present invention.

FIG. 9 is a sectional view illustrating an electrode structure of a touch panel 101 of a display device according to a second embodiment of the present invention. Here, the sectional view illustrated in FIG. 9 corresponds to the sectional view of FIG. 2 of the first embodiment. In particular, the touch panel 101 according to the second embodiment is similar in configuration to the touch panel 101 according to the first embodiment, except for the position for forming the antireflective film. Accordingly, the second embodiment is similar to the first embodiment in terms of material and property of each layer. In the following, the configuration of an antireflective film 12 is described in detail. Note that, the display panel 106 and the touch panel 101 are laminated in a manner similar to that of the first embodiment.

As is apparent from FIG. 9, the touch panel 101 according to the second embodiment of the present invention has a configuration in which the X electrode (transparent conductive film) XP, the first transparent insulating film 2, the Y electrode (transparent conductive film) YP, the second transparent insulating film 3, the antireflective film 12, and the spacers 4 for providing a space with respect to the Z electrode ZP are sequentially laminated on the first transparent substrate 1, and the Z electrode ZP and the elastic layer 5 are further sequentially laminated thereon, with the second transparent substrate 6 being laminated on top thereof. In other words, also in the touch panel 101 according to the second embodiment, the first transparent substrate 1 and the second transparent substrate 6 are disposed to be opposed to each other across the spacers 4. In the configuration, on the opposed surface side of the first transparent substrate 1, the X electrode (transparent conductive film) XP, the first transparent insulating film 2, the Y electrode (transparent conductive film) YP, the second transparent insulating film 3, and the antireflective film 12 including one or a plurality of layers are sequentially laminated. Further, on the opposed surface side of the second transparent substrate 6, the elastic layer 5 and the Z electrode ZP are sequentially laminated. Accordingly, in the touch panel 101 according to the second embodiment, the antireflective film 12 formed as an uppermost layer with respect to the first transparent substrate 1 is in contact with the spacers 4. Further, the Z electrode ZP formed as an uppermost layer with respect to the second transparent substrate 6 is in contact with the spacers 4.

As described above, the touch panel 101 according to the second embodiment of the present invention includes the antireflective film 12 formed in order to suppress light reflected off an interface between the second insulating film 3 and the air layer. With this configuration, the touch panel 101 is increased in transmittance, allowing a display image to be displayed with a high luminance even in a display device configured by including the touch panel 101 of the second embodiment disposed on the display surface side of the display panel 106. Further, generation of reflected light due to external light entering from an operation surface side of the touch panel 101 to be reflected off the interface between the second insulating film 3 and the air layer may be significantly reduced, and hence a display of high contrast may be attained even in a display device which includes the touch panel 101 disposed on the display panel 106.

Figure 10:
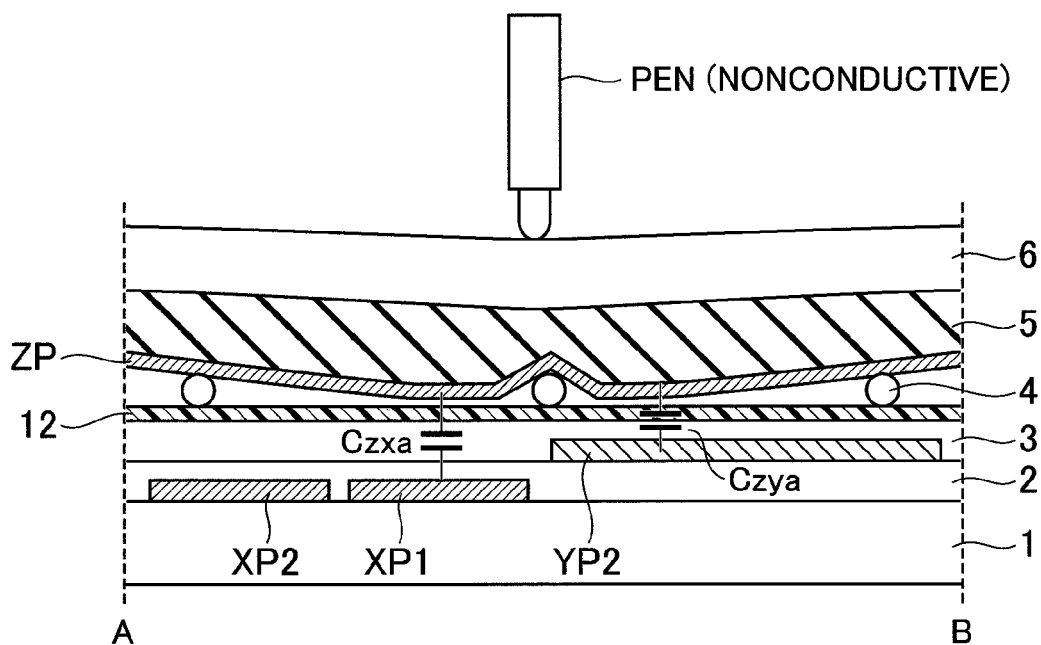
FIG. 10 is a view for illustrating a capacitance change that occurs in the touch panel of the display device according to the second embodiment of the present invention when an input is made thereto with a resin pen.

Next, FIG. 10 is a view for illustrating a capacitance change that occurs in the touch panel 101 of the display device according to the second embodiment of the present invention, when an input is made thereto with a resin pen. In the following, with reference to FIG. 10, a capacitance change that occurs in response to a touch operation made to the touch panel 101 of the display device according to the second embodiment of the present invention is described. Note that, similarly to the first embodiment illustrated in FIG. 4, FIG. 10 is a schematic view for illustrating a capacitance change that occurs in a case where nonconductive input means is used for making a touch operation, and a distance from the X electrode XP to the Z electrode ZP and a distance from the Y electrode YP to the Z electrode ZP are changed due to a pressure applied when the touch panel 101 is touched. Further, the following description may similarly be applied to a case where the distance from the X electrode XP to the Z electrode ZP and the distance from the Y electrode YP to the Z electrode ZP are changed by a pressure applied through conductive input means (such as finger).

As is apparent from FIG. 10, even in a case where a touch operation is made to the touch panel 101 according to the second embodiment of the present invention, similarly to the first embodiment of the present invention, the distances from the Z electrode ZP to each of the X electrode XP and the Y electrode YP are reduced. Accordingly, the capacitance change expressed by Expression (3) of the first embodiment is similarly obtained at this time. As a result, the capacitance detection part 102 becomes capable of detecting a capacitance of each electrode, or a capacitance change that occurs depending on whether or not a touch operation is made as expressed by Expression (3). This allows the arithmetic control part 103 to calculate the coordinates of the input when the touch operation is made, by using, as a signal component, the capacitance of each electrode or the capacitance change obtained by the capacitance detection part 102.

According to the description given above, the input coordinates may be detected based on the capacitance change that occurs when the distance from the X electrode XP to the Z electrode ZP and the distance from the Y electrode YP to the Z electrode ZP are changed due to a pressure, even when the input is made with nonconductive input means. Accordingly, the touch panel 101 according to the second embodiment may be configured as an input device responsive to a pressure applied by using nonconductive input means.

As described above, in the display device according to the second embodiment, the second transparent substrate 6, on which the Z electrode ZP is formed, and the first transparent substrate 1, on which the X electrode XP and the Y electrode YP are formed to be adjacent to each other, are disposed to be opposed to each other across the spacers 4. Accordingly, even when a contact is made onto the touch panel 101 with nonconductive input means, a distance from the X electrode XP or from the Y electrode YP for capacitance detection to the Z electrode ZP formed thereabove is changed, to thereby generate a capacitance change, which allows the touch panel 101 to function as a capacitive coupling type touch panel capable of detecting the input coordinates.

Further, the antireflective film 12 is formed on the opposed surface side of the first transparent substrate 1, and hence generation of reflected light at the interface between an air layer, which is formed due to the formation of the spacers 4, and the opposed surface of the first transparent substrate 1 may be significantly reduced. As a result, even in a display device which includes the touch panel 101 disposed on an upper surface of the display panel 106, an image may be displayed with a high luminance and high contrast.

Third Embodiment

Figure 11:
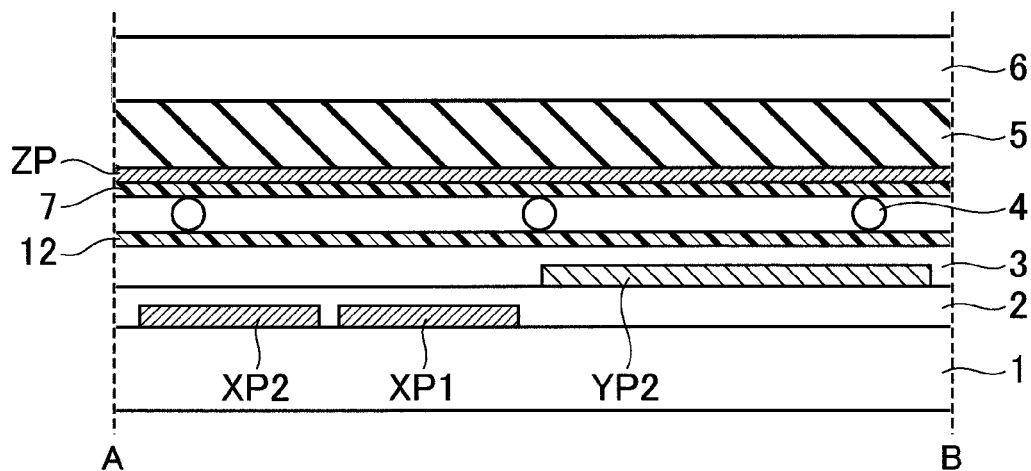
FIG. 11 is a sectional view illustrating an electrode structure of a touch panel of a display device according to a third embodiment of the present invention.

FIG. 11 is a sectional view illustrating an electrode structure of a touch panel 101 of a display device according to a third embodiment of the present invention. Here, the sectional view illustrated in FIG. 11 corresponds to the sectional view of FIG. 2 of the first embodiment. In particular, the touch panel 101 according to the third embodiment is similar in configuration to the touch panel 101 according to the first embodiment, except for the position for forming the antireflective film. Accordingly, the third embodiment is similar to the first embodiment in terms of material and property of each layer. In the following, the configuration of the antireflective film is described in detail. Note that, the display panel 106 and the touch panel 101 are laminated in a manner similar to that of the first embodiment.

As is apparent from FIG. 11, the touch panel 101 according to the third embodiment of the present invention has a configuration in which the X electrode (transparent conductive film) XP, the first transparent insulating film 2, the Y electrode (transparent conductive film) YP, the second transparent insulating film 3, the antireflective film 12, and the spacers 4 for providing a space with respect to the Z electrode ZP are sequentially laminated on the first transparent substrate 1, and the antireflective film 7, the Z electrode ZP, and the elastic layer 5 are further sequentially laminated thereon, with the second transparent substrate 6 being laminated on top thereof.

In other words, also in the touch panel 101 according to the third embodiment, the first transparent substrate 1 (first substrate) and the second transparent substrate (second substrate) 6 are disposed to be opposed to each other across the spacers 4. In the configuration, on the opposed surface side of the first transparent substrate 1, the X electrode (transparent conductive film) XP, the first transparent insulating film 2, the Y electrode (transparent conductive film) YP, the second transparent insulating film 3, and the antireflective film 12 including one or a plurality of layers are sequentially laminated. Further, on the opposed surface side of the second transparent substrate 6, the elastic layer 5, the Z electrode ZP, and the antireflective film 7 including one or a plurality of layers are sequentially laminated. Accordingly, similarly to the second embodiment, in the touch panel 101 according to the third embodiment, the antireflective film 12 formed as an uppermost layer with respect to the first transparent substrate 1 is in contact with the spacers 4. Further, similarly to the first embodiment, the antireflective film 7 formed as an uppermost layer with respect to the second transparent substrate 6 is in contact with the spacers 4.

As described above, the touch panel 101 according to the third embodiment includes the antireflective films 7 and 12 which are formed for alleviating reflected light generated between the interface between the air layer and the second insulating film 3 and the interface between the air layer and the Z electrode ZP. In other words, the second transparent substrate 6 in the touch panel 101 according to the first embodiment and the first transparent substrate 1 in the touch panel 101 according to the second embodiment are disposed to be opposed to each other across the spacers 4, and hence, in addition to the effect of the first embodiment, the effect of the second embodiment is also obtained. Accordingly, with the configuration of the touch panel 101 according to the third embodiment, the touch panel 101 may be increased in transmittance, to thereby attain a display of high luminance. Further, external light reflection in the touch panel 101 may be significantly alleviated, and hence there may be produced a particular effect of attaining a display of high contrast.

Figure 12:
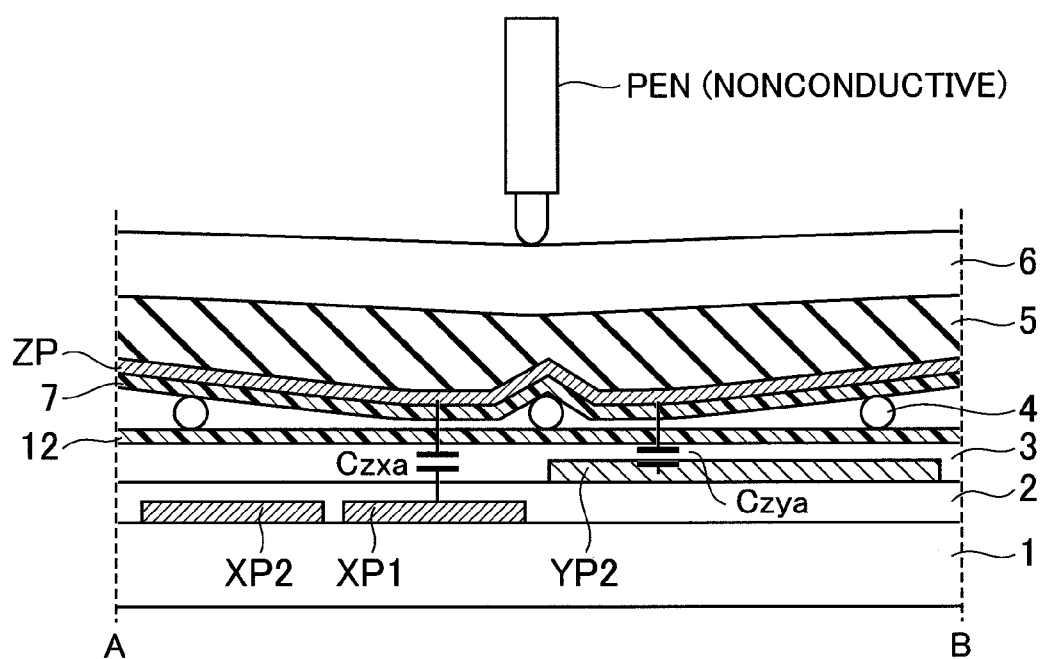
FIG. 12 is a view for illustrating a capacitance change that occurs in the touch panel of the display device according to the third embodiment of the present invention when an input is made thereto with a resin pen.

Next, FIG. 12 is a view for illustrating a capacitance change that occurs in the touch panel 101 of the display device according to the third embodiment of the present invention, when an input is made thereto with a resin pen. In the following, with reference to FIG. 12, a capacitance change that occurs in response to a touch operation made to the touch panel 101 of the display device according to the third embodiment of the present invention is described. Note that, similarly to the first embodiment illustrated in FIG. 4, FIG. 12 is a schematic view for illustrating a capacitance change that occurs in a case where nonconductive input means is used for making a touch operation, and a distance from the X electrode XP to the Z electrode ZP and a distance from the Y electrode YP to the Z electrode ZP are changed due to a pressure applied when the touch panel 101 is touched. Further, the following description may similarly be applied to a case where the distance from the X electrode XP to the Z electrode ZP and the distance from the Y electrode YP to the Z electrode ZP are changed by a pressure applied through conductive input means (such as finger).

As is apparent from FIG. 12, even in a case where a touch operation is made to the touch panel 101 according to the third embodiment of the present invention, similarly to the first embodiment of the present invention, the distances from the Z electrode ZP to each of the X electrode XP and the Y electrode YP are reduced. Accordingly, the capacitance change expressed by Expression (3) of the first embodiment is similarly obtained at this time. As a result, the capacitance detection part 102 becomes capable of detecting a capacitance of each electrode, or a capacitance change that occurs depending on whether or not a touch operation is made as expressed by Expression (3). This allows the arithmetic control part 103 to calculate the coordinates of the input when the touch operation is made, by using, as a signal component, the capacitance of each electrode or the capacitance change obtained by the capacitance detection part 102. Accordingly, the touch panel 101 according to the third embodiment may be configured as an input device responsive to a pressure applied by using nonconductive input means.

As described above, in the display device according to the third embodiment of the present invention, similarly to the first embodiment, the first transparent substrate 1 and the second transparent substrate 6 are disposed to be opposed to each other across the spacers 4, and hence, even when a contact is made onto the touch panel 101 with nonconductive input means, a distance from the X electrode XP or from the Y electrode YP for capacitance detection, which are formed on the first transparent substrate 1, to the Z electrode ZP, which is formed on the second transparent substrate 6, is changed, to thereby generate a capacitance change, which allows the touch panel 101 to function as a capacitive coupling type touch panel capable of detecting the input coordinates.

Further, the antireflective film 12 is formed on the opposed surface side of the first transparent substrate 1 while the antireflective film 7 is formed on the opposed surface side of the second transparent substrate 6. Accordingly, reflection at the interface between an air layer, which is formed due to the formation of the spacers 4, and the opposed surface of the first transparent substrate 1, and reflection at the interface between the air layer and the opposed surface of the second transparent substrate 6 may be significantly reduced. As a result, even in a display device which includes the touch panel 101 disposed on an upper surface of the display panel 106, an image may be displayed with a high luminance and high contrast.

Fourth Embodiment

Figure 13:
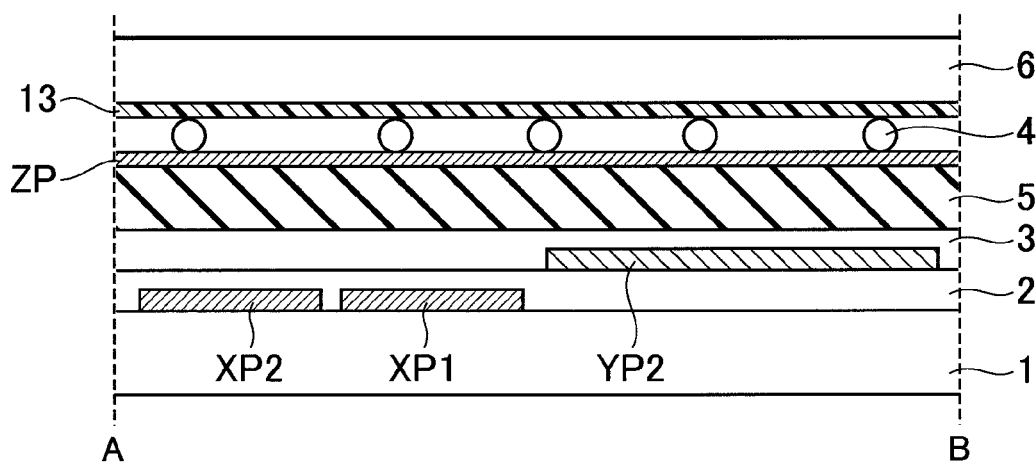
FIG. 13 is a sectional view illustrating an electrode structure of a touch panel of a display device according to a fourth embodiment of the present invention.

FIG. 13 is a sectional view illustrating an electrode structure of a touch panel 101 of a display device according to a fourth embodiment of the present invention. Here, the sectional view illustrated in FIG. 13 corresponds to the sectional view of FIG. 2 of the first embodiment. In particular, the touch panel 101 according to the fourth embodiment has a configuration in which other thin films than the antireflective film of the first embodiment are formed on the first transparent substrate 1 side. However, each layer may be formed of thin films similar to those of the first embodiment in terms of material and property. In the following, the configuration of an antireflective film is described in detail. Note that, the display panel 106 and the touch panel 101 are laminated in a manner similar to that of the first embodiment.

As is apparent from FIG. 13, the touch panel 101 according to the fourth embodiment of the present invention has a configuration in which the X electrode (transparent conductive film) XP, the first transparent insulating film 2, the Y electrode (transparent conductive film) YP, the second transparent insulating film 3, the elastic layer 5, the Z electrode ZP, and the spacers 4 for providing a space between an antireflective film 13 and the Z electrode ZP are sequentially laminated on the first transparent substrate 1, and the second transparent substrate 6 is further laminated on the antireflective film 13.

In other words, also in the touch panel 101 according to the fourth embodiment, the first transparent substrate (first substrate) 1 and the second transparent substrate (second substrate) 6 are disposed to be opposed to each other across the spacers 4. In the configuration, on the opposed surface side of the first transparent substrate 1, the X electrode (transparent conductive film) XP, the first transparent insulating film 2, the Y electrode (transparent conductive film) YP, the second transparent insulating film 3, the elastic layer 5, and the Z electrode ZP are sequentially laminated. Further, on the opposed surface side of the second transparent substrate 6, the antireflective film 7 including one or a plurality of layers is formed. Accordingly, in the touch panel 101 according to the fourth embodiment, the Z electrode ZP formed as an uppermost layer with respect to the first transparent substrate 1 is in contact with the spacers 4. Further, the antireflective film 13 formed on the opposed side of the second transparent substrate 6 is in contact with the spacers 4.

As described above, the touch panel 101 according to the fourth embodiment includes the antireflective film 13 which is formed in order to suppress light reflected off the interface between the second transparent substrate 6 and the air layer. Due to the formation of the antireflective film 13, the touch panel 101 is increased in transmittance, and an image from the display panel 106 may be displayed with a high luminance. Further, reflected light in the touch panel 101 may be alleviated, and hence, even in a display device which includes the touch panel 101 disposed on an upper surface of the display panel 106, an image may be displayed in high contrast.

Figure 14:
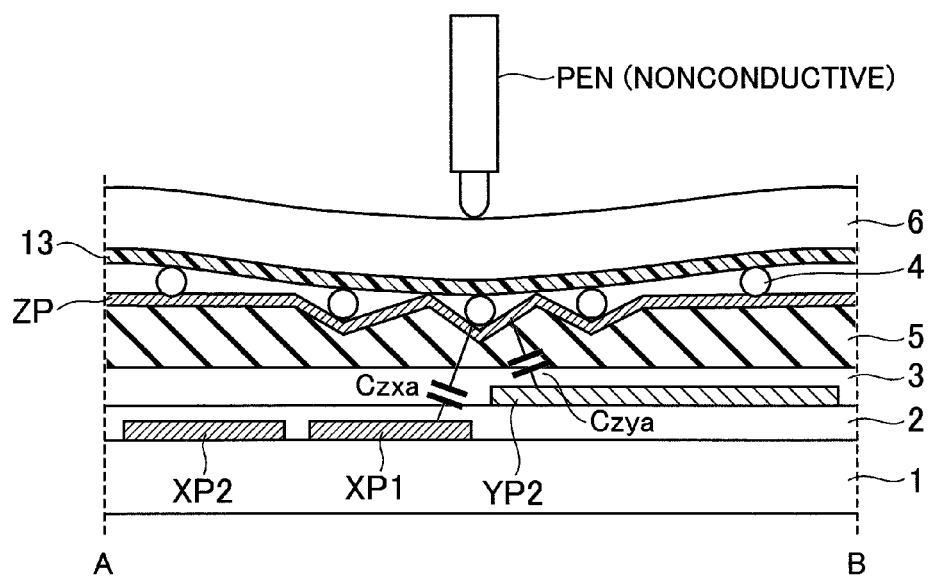
FIG. 14 is a view for illustrating a capacitance change that occurs in the touch panel of the display device according to the fourth embodiment of the present invention when an input is made thereto with a resin pen.

Next, FIG. 14 is a view for illustrating a capacitance change that occurs in the touch panel 101 of the display device according to the fourth embodiment of the present invention, when an input is made thereto with a resin pen. In the following, with reference to FIG. 14, a capacitance change that occurs in response to a touch operation made to the touch panel 101 of the display device according to the fourth embodiment of the present invention is described. Note that, similarly to the first embodiment illustrated in FIG. 4, FIG. 14 is a schematic view for illustrating a capacitance change that occurs in a case where nonconductive input means is used for making a touch operation, and a distance from the X electrode XP to the Z electrode ZP and a distance from the Y electrode YP to the Z electrode ZP are changed due to a pressure applied when the touch panel 101 is touched. Further, the following description may similarly be applied to a case where the distance from the X electrode XP to the Z electrode ZP and the distance from the Y electrode YP to the Z electrode ZP are changed by a pressure applied through conductive input means (such as finger).

As is apparent from FIG. 14, even in a case where a touch operation is made to the touch panel 101 according to the fourth embodiment of the present invention, similarly to the first embodiment of the present invention, the distances from the Z electrode ZP to each of the X electrode XP and the Y electrode YP are reduced. Accordingly, the capacitance change expressed by Expression (3) of the first embodiment is similarly obtained at this time. As a result, the capacitance detection part 102 becomes capable of detecting a capacitance of each electrode, or a capacitance change that occurs depending on whether or not a touch operation is made as expressed by Expression (3). This allows the arithmetic control part 103 to calculate the coordinates of the input when the touch operation is made, that is, the coordinates of the portion where the pressure is applied by the touch operation, by using, as a signal component, the capacitance of each electrode or the capacitance change obtained by the capacitance detection part 102.

At this time, in the touch panel 101 according to the fourth embodiment, the Z electrode ZP is formed as an upper layer above the first transparent substrate 1 through the elastic layer 5, and hence distances from the X electrode XP and from the Y electrode YP to the Z electrode ZP may be reduced. As a result, the capacitance Czx formed by the X electrode XP and the Z electrode and the capacitance Czy formed by the Y electrode YP and the Z electrode ZP and a capacitance change that occurs when a pressure is applied may be increased, to thereby reduce false detection of external noise or the like. Further, in the touch panel 101 of the fourth embodiment, the Z electrode ZP is formed as an upper layer above the first transparent substrate 1 through the elastic layer 5, and hence there may be produced a particular effect that the antireflective film 13 may be formed without changing the detection property of the touch panel 101.

According to the description given above, even when a contact is made onto the touch panel 101 with nonconductive input means, a distance from the X electrode XP or from the Y electrode YP for capacitance detection to the Z electrode ZP formed thereabove is changed, to thereby generate a capacitance change, which allows the touch panel 101 to function as a capacitive coupling type touch panel capable of detecting the input coordinates. Further, even in a case where the touch panel 101 is disposed on the display panel 106, an image with a high luminance and high contrast may be displayed. In other words, even when an input is made with nonconductive input means, the distance from the X electrode XP to the Z electrode ZP and the distance from the Y electrode YP to the Z electrode ZP are changed due to the pressure, to thereby detect the input coordinates based on the change in capacitance. Accordingly, the touch panel 101 according to the fourth embodiment may be configured as an input device responsive to a pressure applied by using nonconductive input means.

As described above, in the display device according to the fourth embodiment of the present invention, the first transparent substrate 1, in which the X electrode XP and the Y electrode YP are formed to be opposed to the Z electrode ZP across the elastic layer 5, and the second transparent substrate 6 are formed to be opposed to each other across the spacers 4, and hence, even when a contact is made onto the touch panel 101 with nonconductive input means, the spacers 4 are capable of significantly deforming the elastic layer 5 under a pressure applied by the contact made to the touch panel 101. As a result, a distance from the X electrode XP or from the Y electrode YP for capacitance detection to the Z electrode ZP, the X electrode XP and the Y electrode YP each being disposed to be opposed to the Z electrode ZP across the elastic layer 5, is significantly changed, to thereby generate a large capacitance change in the capacitance Czx formed by the X electrode XP and the Z electrode ZP and in the capacitance Czy formed by the Y electrode YP and the Z electrode ZP, which allows the touch panel 101 to function as a capacitive coupling type touch panel capable of detecting the input coordinates.

Further, the antireflective film 13 is formed on the opposed surface side of the second transparent substrate 6, reflection at the interface between the air layer, which is formed due to the formation of the spacers 4, and the opposed surface of the second transparent substrate 6 may be significantly reduced. As a result, even in a display device which includes the touch panel 101 disposed on the upper surface of the display panel 106, an image with a high luminance and high contrast may be displayed.

Note that, in the touch panel 101 according to the fourth embodiment, the Z electrode ZP is formed on the first transparent substrate 1 side. However, the present invention is not limited thereto, and the Z electrode ZP may be formed on the second transparent substrate 6 side. In this case, a most appropriate position for forming the Z electrode ZP may be in a lower layer of the antireflective film 13, that is, between the second transparent substrate 6 and the antireflective film 13.

Fifth Embodiment

Figure 15:
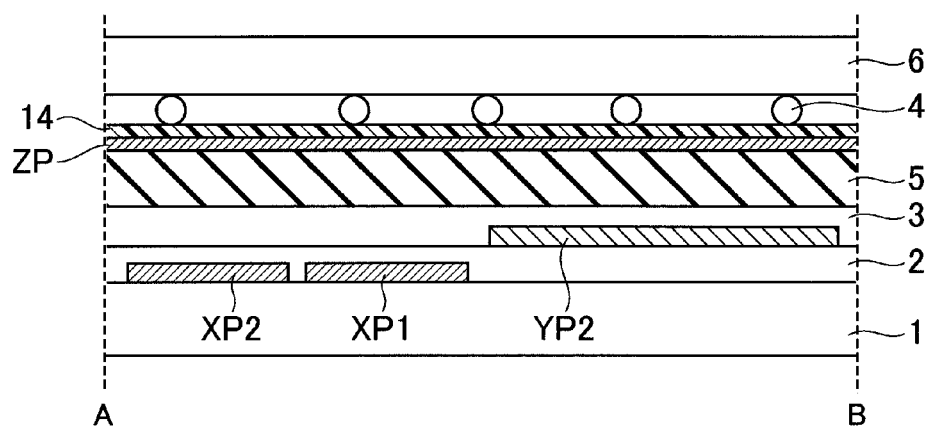
FIG. 15 is a sectional view illustrating an electrode structure of a touch panel of a display device according to a fifth embodiment of the present invention.

FIG. 15 is a sectional view illustrating an electrode structure of a touch panel 101 of a display device according to a fifth embodiment of the present invention. Here, the sectional view illustrated in FIG. 15 corresponds to the sectional view of FIG. 2 of the first embodiment. In particular, the touch panel 101 according to the fifth embodiment is similar in configuration to the touch panel 101 according to the fourth embodiment, except for the position for forming the antireflective film of the fourth embodiment. Accordingly, the fifth embodiment is similar to the fourth embodiment and hence the first embodiment in terms of material and property of each layer. In the following, the configuration of an antireflective film 14 is described in detail. Note that, the display panel 106 and the touch panel 101 are laminated in a manner similar to that of the first embodiment.

As is apparent from FIG. 15, the touch panel 101 according to the fifth embodiment of the present invention has a configuration in which the X electrode (transparent conductive film) XP, the first transparent insulating film 2, the Y electrode (transparent conductive film) YP, the second transparent insulating film 3, the elastic layer 5, the Z electrode ZP, the antireflective film 14, and the spacers 4 for providing a space between the antireflective film 14 and the second transparent substrate 6 are sequentially laminated on the first transparent substrate 1, with the second transparent substrate 6 being laminated on top thereof.

In other words, also in the touch panel 101 according to the fifth embodiment, the first transparent substrate (first substrate) 1 and the second transparent substrate (second substrate) 6 are disposed to be opposed to each other across the spacers 4. In the configuration, on the opposed surface side of the first transparent substrate 1, the X electrode (transparent conductive film) XP, the first transparent insulating film 2, the Y electrode (transparent conductive film) YP, the second transparent insulating film 3, the elastic layer 5, the Z electrode ZP, and the antireflective film 14 including one or a plurality of layers are sequentially laminated. Accordingly, in the touch panel 101 according to the fifth embodiment, the antireflective film 14 formed as an uppermost layer with respect to the first transparent substrate 1 is in contact with the spacers 4. Further, on the second transparent substrate 6 side, the second transparent substrate 6 is in direct contact with the spacers 4.

As described above, the touch panel according to the fifth embodiment includes the antireflective film 14 which is formed in order to suppress light reflected off the interface between the Z electrode ZP formed on the first transparent substrate 1 and the air layer. Due to the formation of the antireflective film 14, the touch panel 101 is increased in transmittance, and an image from the display panel 106 may be displayed with a high luminance. Further, reflected light in the touch panel 101 may be alleviated, and hence, even in a display device which includes the touch panel 101 disposed on an upper surface of the display panel 106, an image may be displayed in high contrast.

Figure 16:
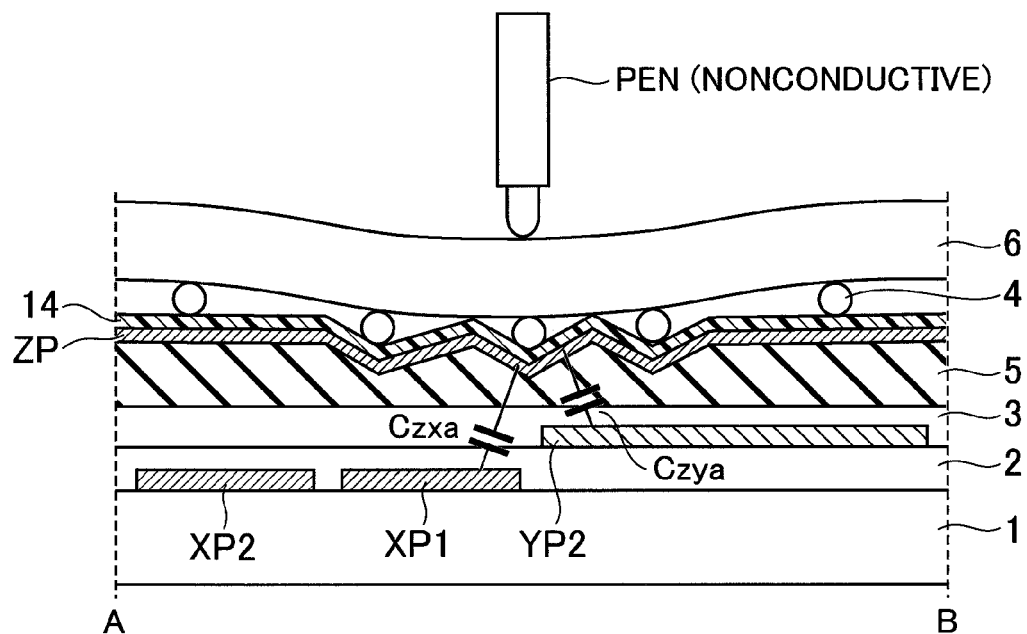
FIG. 16 is a view for illustrating a capacitance change that occurs in the touch panel of the display device according to the fifth embodiment of the present invention when an input is made thereto with a resin pen.

Next, FIG. 16 is a view for illustrating a capacitance change that occurs in the touch panel 101 of the display device according to the fifth embodiment of the present invention, when an input is made thereto with a resin pen. In the following, with reference to FIG. 16, a capacitance change that occurs in response to a touch operation made to the touch panel 101 of the display device according to the fifth embodiment of the present invention is described. Note that, similarly to the first embodiment illustrated in FIG. 4, FIG. 16 is a schematic view for illustrating a capacitance change that occurs in a case where nonconductive input means is used for making a touch operation, and a distance from the X electrode XP to the Z electrode ZP and a distance from the Y electrode YP to the Z electrode ZP are changed due to a pressure applied when the touch panel 101 is touched. Further, the following description may similarly be applied to a case where the distance from the X electrode XP to the Z electrode ZP and the distance from the Y electrode YP to the Z electrode ZP are changed by a pressure applied through conductive input means (such as finger).

As is apparent from FIG. 16, even in a case where a touch operation is made to the touch panel 101 according to the fifth embodiment of the present invention, similarly to the first embodiment of the present invention, the distances from the Z electrode ZP to each of the X electrode XP and the Y electrode YP are reduced. Accordingly, the capacitance change expressed by Expression (3) of the first embodiment is similarly obtained at this time. As a result, the capacitance detection part 102 becomes capable of detecting a capacitance of each electrode, or a capacitance, change that occurs depending on whether or not a touch operation is made as expressed by Expression (3). This allows the arithmetic control part 103 to calculate the coordinates of the input when the touch operation is made, that is, the coordinates of the portion where the pressure is applied by the touch operation, by using, as a signal component, the capacitance of each electrode or the capacitance change obtained by the capacitance detection part 102.

At this time, also in the touch panel 101 according to the fifth embodiment, the Z electrode ZP is formed as an upper layer above the first transparent substrate 1 through the elastic layer 5, and hence, similarly to the fourth embodiment, false detection of external noise or the like may be reduced. Further, similarly to the fourth embodiment, the Z electrode ZP is formed as the upper layer above the first transparent substrate 1 through the elastic layer 5, and hence there may be produced a particular effect that the antireflective film 14 may be formed without changing the detection property of the touch panel 101.

According to the description given above, even when a contact is made onto the touch panel 101 with nonconductive input means, a distance from the X electrode XP or from the Y electrode YP for capacitance detection to the Z electrode ZP formed thereabove is changed, to thereby generate a capacitance change, which allows the touch panel 101 to function as a capacitive coupling type touch panel capable of detecting the input coordinates. Further, even in a case where the touch panel 101 according to the fifth embodiment is disposed on the display surface of the display panel 106, an image with a high luminance and high contrast may be displayed. In other words, even when an input is made with nonconductive input means, the distance from the X electrode XP to the Z electrode ZP and the distance from the Y electrode YP to the Z electrode ZP are changed due to the pressure, to thereby detect the input coordinates based on the change in capacitance. Accordingly, the touch panel 101 according to the fifth embodiment may be configured as an input device responsive to a pressure applied by using nonconductive input means.

As described above, in the display device according to the fifth embodiment of the present invention, the first transparent substrate 1, in which the X electrode XP and the Y electrode YP are formed to be opposed to the Z electrode ZP across the elastic layer 5, and the second transparent substrate 6 are formed to be opposed to each other across the spacers 4, and hence, even when a contact is made onto the touch panel 101 with nonconductive input means, the spacers 4 are capable of significantly deforming the elastic layer 5 under a pressure applied by the contact made to the touch panel 101. As a result, a distance from the X electrode XP or from the Y electrode YP for capacitance detection to the Z electrode ZP, the X electrode XP and the Y electrode YP each being disposed to be opposed to the Z electrode ZP across the elastic layer 5, is significantly changed, to thereby generate a large capacitance change in the capacitance Czx formed by the X electrode XP and the Z electrode ZP and in the capacitance Czy formed by the Y electrode YP and the Z electrode ZP, which allows the touch panel 101 to function as a capacitive coupling type touch panel capable of detecting the input coordinates.

Further, the antireflective film 14 is formed on the opposed surface side of the Z electrode ZP formed on the first transparent substrate 1, and hence reflection at the interface between the air layer, which is formed due to the formation of the spacers 4, and the Z electrode ZP may be significantly reduced. As a result, even in a display device which includes the touch panel 101 disposed on the upper surface of the display panel 106, an image with a high luminance and high contrast may be displayed.

Note that, in the touch panel 101 according to the fifth embodiment, the Z electrode ZP is formed on the first transparent substrate 1 side. However, the present invention is not limited thereto. The Z electrode ZP may be formed on the opposed surface side of the second transparent substrate 6.

Sixth Embodiment

Figure 17:
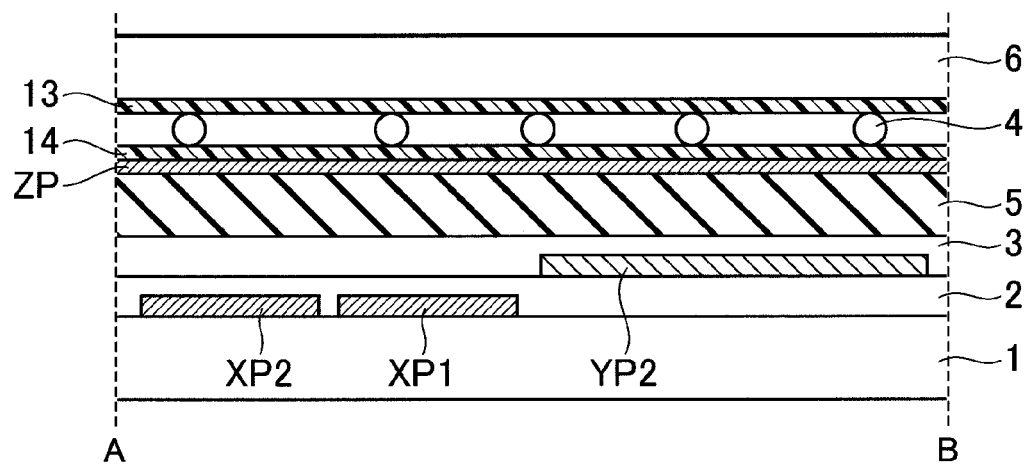
FIG. 17 is a sectional view illustrating an electrode structure of a touch panel of a display device according to a sixth embodiment of the present invention.

FIG. 17 is a sectional view illustrating an electrode structure of a touch panel 101 of a display device according to a sixth embodiment of the present invention. Here, the sectional view illustrated in FIG. 17 corresponds to the sectional view of FIG. 2 of the first embodiment. Further, the touch panel 101 according to the sixth embodiment is similar in configuration to the touch panel 101 according to the fourth embodiment, except for the position for forming the antireflective film. Accordingly, the sixth embodiment is similar to the first embodiment in terms of material and property of each layer. In the following, the configuration of the antireflective film is described in detail. Note that, the display panel 106 and the touch panel 101 are laminated in a manner similar to that of the first embodiment.

As is apparent from FIG. 17, the touch panel 101 according to the sixth embodiment has a configuration in which the X electrode (transparent conductive film) XP, the first transparent insulating film 2, the Y electrode (transparent conductive film) YP, the second transparent insulating film 3, the elastic layer 5, the Z electrode ZP, and the antireflective film 14 are sequentially laminated on the first transparent substrate 1, the spacers 4 for providing a space between the antireflective film 14 and the antireflective film 13 are formed, and the second transparent substrate 6 is further laminated on the antireflective film 14.

In other words, also in the touch panel 101 according to the sixth embodiment, the first transparent substrate (first substrate) 1 and the second transparent substrate (second substrate) 6 are disposed to be opposed to each other across the spacers 4. In the configuration, on the opposed surface side of the first transparent substrate 1, the X electrode (transparent conductive film) XP, the first transparent insulating film 2, the Y electrode (transparent conductive film) YP, the second transparent insulating film 3, the elastic layer 5, the Z electrode ZP, and the antireflective film 14 including one or a plurality of layers are sequentially laminated. Further, on the opposed surface side of the second transparent substrate 6, the antireflective film 13 including one or a plurality of layers is formed. Accordingly, similarly to the fifth embodiment, in the touch panel 101 according to the sixth embodiment, the antireflective film 14 formed as an uppermost layer with respect to the first transparent substrate 1 is in contact with the spacers 4. Further, similarly to the fourth embodiment, the antireflective film 13 formed as an uppermost layer with respect to the second transparent substrate 6 is in contact with the spacers 4.

As described above, the touch panel 101 according to the sixth embodiment includes the antireflective films 13 and 14 which are formed for alleviating reflected light generated between the interface between the air layer and the second insulating film 3 and the interface between the air layer and the Z electrode ZP. In other words, the second transparent substrate 6 in the touch panel 101 according to the fourth embodiment and the first transparent substrate 1 in the touch panel 101 according to the fifth embodiment are disposed to be opposed to each other across the spacers 4, and hence, in the touch panel of the sixth embodiment, the effect of the fifth embodiment is also obtained in addition to the effect of the fourth embodiment. Accordingly, with the configuration of the touch panel 101 according to the sixth embodiment, the touch panel 101 may be increased in transmittance, to thereby attain a display of high luminance. Further, external light reflection in the touch panel 101 may be significantly alleviated, and hence there may be produced a particular effect of attaining a display of high contrast.

Figure 18:
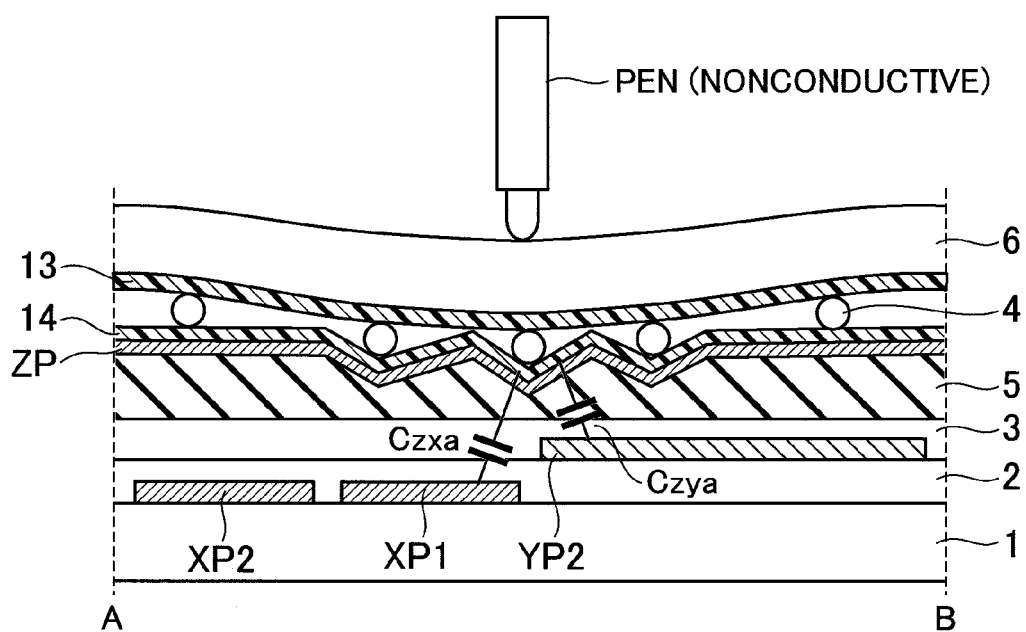
FIG. 18 is a view for illustrating a capacitance change that occurs in the touch panel of the display device according to the sixth embodiment of the present invention when an input is made thereto with a resin pen.

Next, FIG. 18 is a view for illustrating a capacitance change that occurs in the touch panel 101 of the display device according to the sixth embodiment of the present invention, when an input is made thereto with a resin pen. In the following, with reference to FIG. 18, a capacitance change that occurs in response to a touch operation made to the touch panel 101 of the display device according to the sixth embodiment of the present invention is described. Note that, similarly to the first embodiment illustrated in FIG. 4, FIG. 18 is a schematic view for illustrating a capacitance change that occurs in a case where nonconductive input means is used for making a touch operation, and a distance from the X electrode XP to the Z electrode ZP and a distance from the Y electrode YP to the Z electrode ZP are changed due to a pressure applied when the touch panel 101 is touched. Further, the following description may similarly be applied to a case where the distance from the X electrode XP to the Z electrode ZP and the distance from the Y electrode YP to the Z electrode ZP are changed by a pressure applied through conductive input means (such as finger).

As is apparent from FIG. 18, even in a case where a touch operation is made to the touch panel 101 according to the sixth embodiment of the present invention, similarly to the fourth embodiment and hence the first embodiment of the present invention, the distances from the Z electrode ZP to each of the X electrode XP and the Y electrode YP are reduced. Accordingly, the capacitance change expressed by Expression (3) of the first embodiment is similarly obtained at this time. As a result, the capacitance detection part 102 becomes capable of detecting a capacitance of each electrode, or a capacitance change that occurs depending on whether or not a touch operation is made as expressed by Expression (3). This allows the arithmetic control part 103 to calculate the coordinates of the input when the touch operation is made, by using, as a signal component, the capacitance of each electrode or the capacitance change obtained by the capacitance detection part 102. Accordingly, the touch panel 101 according to the sixth embodiment may be configured as an input device responsive to a pressure applied by using nonconductive input means.

At this time, also in the touch panel 101 according to the sixth embodiment, the Z electrode ZP is formed as an upper layer above the first transparent substrate 1 through the elastic layer 5, and hence, similarly to the fourth embodiment, false detection of external noise or the like may be reduced. Further, similarly to the fourth embodiment, the Z electrode ZP is formed as the upper layer above the first transparent substrate 1 through the elastic layer 5, and hence there may be produced a particular effect that the antireflective film 13 may be formed without changing the detection property of the touch panel 101.

As described above, in the display device according to the sixth embodiment of the present invention, similarly to the fourth and fifth embodiments, the first transparent substrate 1, in which the X electrode XP and the Y electrode YP are formed to be opposed to the Z electrode ZP across the elastic layer 5, and the second transparent substrate 6 are formed to be opposed to each other across the spacers 4, and hence, even when a contact is made onto the touch panel 101 with nonconductive input means, the spacers 4 are capable of significantly deforming the elastic layer 5 under a pressure applied by the contact made to the touch panel 101. As a result, a distance from the X electrode XP or from the Y electrode YP for capacitance detection to the Z electrode ZP, the X electrode XP and the Y electrode YP each being disposed to be opposed to the Z electrode ZP may be significantly changed through the elastic layer 5. By changing the distance from the X electrode XP or from the Y electrode YP for capacitance detection to the Z electrode ZP, a large capacitance change may be generated in the capacitance Czx formed by the X electrode XP and the Z electrode ZP and in the capacitance Czy formed by the Y electrode YP and the Z electrode ZP, which allows the touch panel 101 to function as a capacitive coupling type touch panel capable of detecting the input coordinates.

Further, the antireflective film 14 is formed on the opposed surface side of the first transparent substrate 1 while the antireflective film 13 is formed on the opposed surface side of the second transparent substrate 6. Accordingly, reflection at the interface between an air layer, which is formed due to the formation of the spacers 4, and the opposed surface of the first transparent substrate 1, and reflection at the interface between the air layer and the opposed surface of the second transparent surface may be significantly reduced. As a result, even in a display device which includes the touch panel 101 disposed on an upper surface of the display panel 106, an image may be displayed with a high luminance and high contrast.

Note that, in the touch panel 101 according to the sixth embodiment, the Z electrode ZP is formed on the first transparent substrate 1 side. However, the present invention is not limited thereto. The Z electrode ZP may be formed on the second transparent substrate 6 side. In this case, a most appropriate position for forming the Z electrode ZP may be, similarly to the fourth embodiment, in a lower layer of the antireflective film 13, that is, between the second transparent substrate 6 and the antireflective film 13.

Seventh Embodiment

Figure 19:
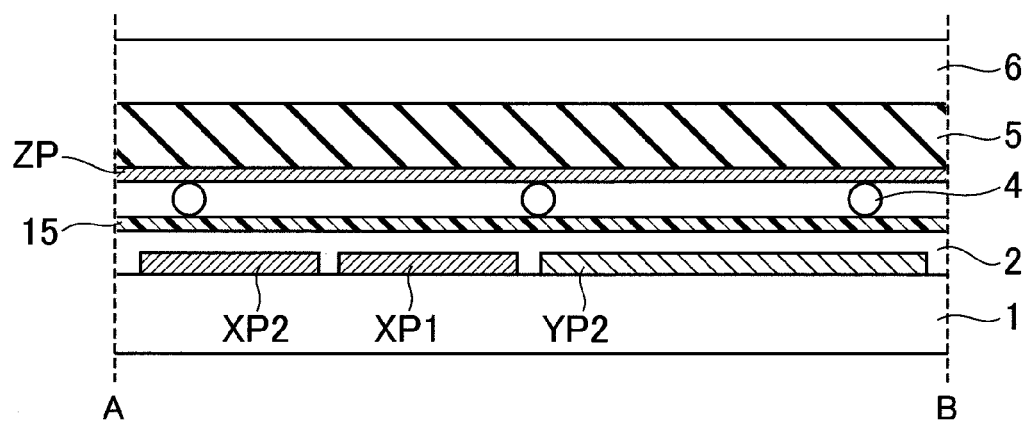
FIG. 19 is a sectional view illustrating an electrode structure of a touch panel of a display device according to a seventh embodiment of the present invention.
Figure 20:
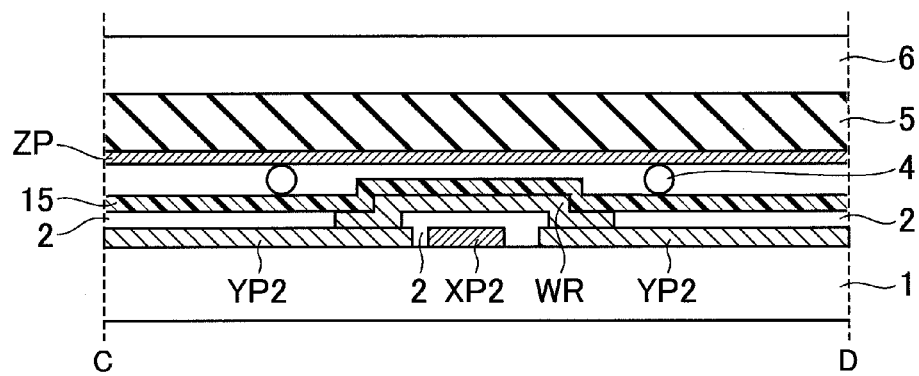
FIG. 20 is a sectional view illustrating a signal line structure for connecting adjacent electrodes of the touch panel of the display device according to the seventh embodiment of the present invention.
Figure 21:
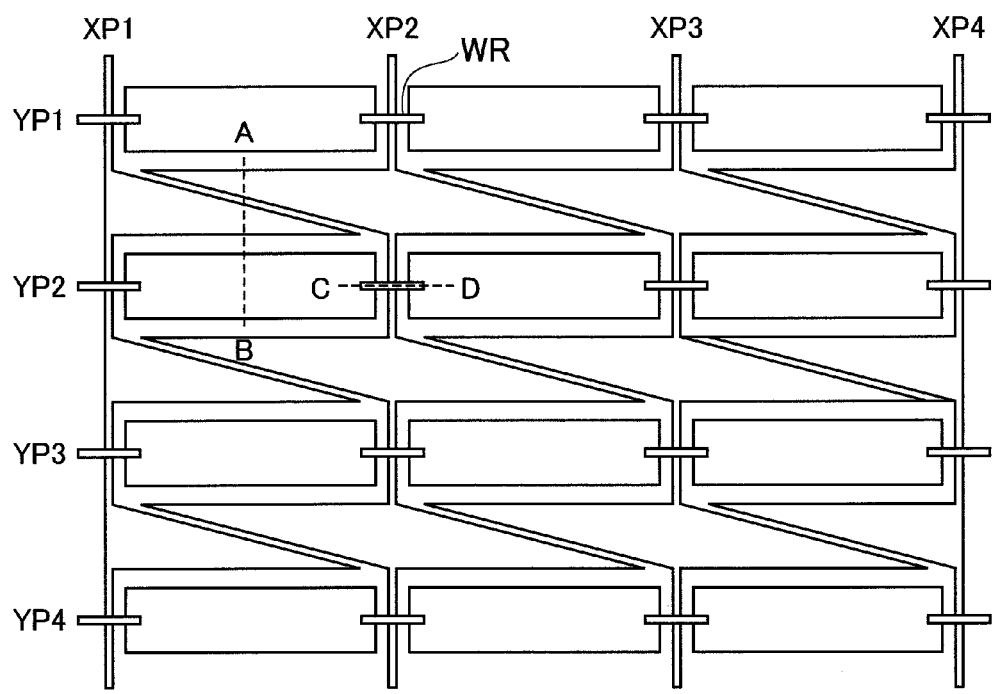
FIG. 21 is a plan view illustrating the electrode structure of the touch panel of the display device according to the seventh embodiment of the present invention.

FIG. 19 is a sectional view illustrating an electrode structure of a touch panel 101 of a display device according to a seventh embodiment of the present invention, FIG. 20 is a sectional view illustrating a signal line structure for connecting adjacent electrodes of the touch panel 101 of the display device according to the seventh embodiment of the present invention, and FIG. 21 is a plan view illustrating the electrode structure of the touch panel 101 of the display device according to the seventh embodiment of the present invention. The sectional view illustrated in FIG. 19 is taken along the line A-B of FIG. 21, and the sectional view illustrated in FIG. 20 is taken along the line C-D of FIG. 21. Further, the sectional views of FIGS. 19 and 20 illustrate only the layers that are necessary for describing the operation of the touch panel 101. Further, the seventh embodiment is similar in configuration to the first embodiment, except for the position for forming the Y electrodes YP and the configuration of the thin line portion WR connecting the adjacent Y electrodes YP. In the following, the configurations of the Y electrodes YP and the thin line portion WR are described in detail.

In the following, with reference to FIGS. 19 to 21, a configuration of the touch panel according to the seventh embodiment is described. In FIG. 21, the X electrodes XP and the Y electrodes YP are both similar in shape to those of the first embodiment, but are different in laminated structure of the electrodes (pad portions) and the thin line portions. In the seventh embodiment, as illustrated in FIG. 19, on the first transparent substrate 1, the X electrode XP (pad portion), the thin line portion of the X electrode XP, and the Y electrode YP (pad portion), which are each formed of transparent conductive films, are formed. As illustrated in FIG. 20, the thin line portion WR of the Y electrodes YP is formed on the first insulating film 2 laminated on the X electrodes XP (pad portion) and the Y electrodes YP (pad portion). At this time, the first insulating film 2 is patterned so that the Y electrodes YP (pad portion) and the thin line portion WR are electrically connected to each other. An antireflective film 15 is formed on the first insulating film 2. The spacers 4 are formed between the antireflective film 15 and the Z electrode ZP at predetermined intervals. The elastic layer 5 is laminated on the Z electrode ZP, and the second transparent substrate 6 is laminated on the elastic layer 5, to thereby form the touch panel 101. The seventh embodiment is similar to the first embodiment in terms of material and property of each layer. Note that, in the seventh embodiment, the thin line portion of the Y electrodes YP is formed as the thin line portion WR which is formed of a thin film layer different from that forming the X electrodes XP and the Y electrodes YP. However, the present invention is not limited thereto. The thin line portion of the X electrodes XP may be formed as the thin line portion WR formed of a thin film layer different from that forming the X electrodes XP and the Y electrodes YP, while the thin line portion of the Y electrode YP may be formed in the same layer forming the X electrodes XP (pad portion) and the Y electrodes YP (pad portion).

As described above, in the touch panel 101 according to the seventh embodiment, as is apparent from FIG. 19, the X electrodes XP and the Y electrodes YP are formed in the same layer on the opposed surface side of the first transparent substrate 1. Further, as is apparent from FIG. 21, in the touch panel 101 according to the seventh embodiment, the pad portions of the X electrodes XP and the Y electrodes YP are in the same shapes as those of the first embodiment. Specifically, in the touch panel 101 of the seventh embodiment, in an area where the X electrodes XP and the Y electrodes YP are formed, the X electrodes XP and the Y electrodes YP are formed in the same layer on the first transparent substrate 1, and the first transparent insulating layer 2 is formed thereon. The antireflective film 15 is formed on the first transparent insulating film 2.

At this time, the touch panel 101 according to the present invention is configured to detect a capacitance change that occurs between the X electrodes serving as signal lines XP1 to XP4 extending in a longitudinal direction (direction of the y-axis) while being arranged in parallel with one another in a lateral direction (direction of the x-axis) of FIG. 21 and the Y electrodes serving as signal lines YP1 to YP4 (including thin line portions WR) extending in the lateral direction while being arranged in parallel with one another in the longitudinal direction. Accordingly, the signal lines XP1 to XP4 and the signal lines YP1 to YP4 need to be insulated from each other. In order to attain such a configuration, in the touch panel 101 according to the seventh embodiment, as illustrated in FIG. 20, in each of areas where the thin line portions of the signal lines XP1 to XP4 extending in the longitudinal direction of FIG. 21 intersect with the thin line portions WR of the signal lines YP1 to YP4 extending in the lateral direction of FIG. 21, the transparent insulating film 2 is formed as an upper layer of the thin line portion of the X electrode XP, and the thin line portion WR which is formed of a transparent conductive material and serves as a signal line for connecting the adjacent Y electrodes YP to each other is formed as an upper layer of the transparent insulating film 2. Note that, the transparent conductive material for forming the thin line portion WR may be the same material as the transparent conductive material for forming the X electrodes and the Y electrodes, but is not limited to the same transparent conductive material.

As described above, in the touch panel 101 according to the seventh embodiment, the conducting wire layer excluding the thin line portion WR is formed in the same layer, and hence, in addition to the effect of the first embodiment described above, an effect of reducing the number of thin film layers forming the touch panel 101 may also be obtained, which leads to a reduction in the number of process steps required for manufacturing the touch panel 101 so that the touch panel may be manufactured at low cost. Further, the configuration of the thin film layers for forming the touch panel 101 may be simplified, and the touch panel 101 with the reduced number of thin film layers is capable of significantly minimizing deterioration to be caused in quality of an image from the display panel that has passed through the touch panel 101.

Further, even in the touch panel 101 according to the seventh embodiment, the first transparent substrate 1 and the second transparent substrate 6 are disposed to be opposed to each other across the spacers 4. At this time, on the opposed surface side of the first transparent substrate 1, the X electrode (transparent conductive film) XP, the Y electrode (transparent conductive film) YP, the first transparent insulating film 2, the transparent conductive film forming the thin line portion WR, and the antireflective film 15 including one or a plurality of layers are sequentially laminated. Further, similarly to the first embodiment, on the opposed surface side of the second transparent substrate 6, the elastic layer 5 and the Z electrode ZP are sequentially laminated. Accordingly, even in the touch panel 101 according to the seventh embodiment, similarly to the first embodiment, the antireflective film 15 formed in an uppermost layer with respect to the first transparent substrate 1 is in contact with the spacers 4. Further, similarly to the first embodiment, the Z electrode ZP formed in an uppermost layer with respect to the second transparent substrate 6 is in contact with the spacers 4.

As described above, the touch panel 101 according to the seventh embodiment includes the antireflective film 15 which is formed at the interface between the air layer and the thin line portion WR or the first insulating film 2 formed on the first transparent substrate 1, and hence light reflected off the interface may be reduced. With this configuration, the touch panel 101 may be increased in transmittance, and hence an image from the display panel 106 may be displayed with a high luminance. Further, reflected light in the touch panel 101 may be reduced, and hence, even in a display device which includes the touch panel 101 disposed on the display panel 106, a display of high contrast may be attained. Further, the thin line portion WR may be insulated and improved in flaw resistance. In other words, the antireflective film 15 may also be used as a protective film for protecting the thin line portion WR.

Figure 22:
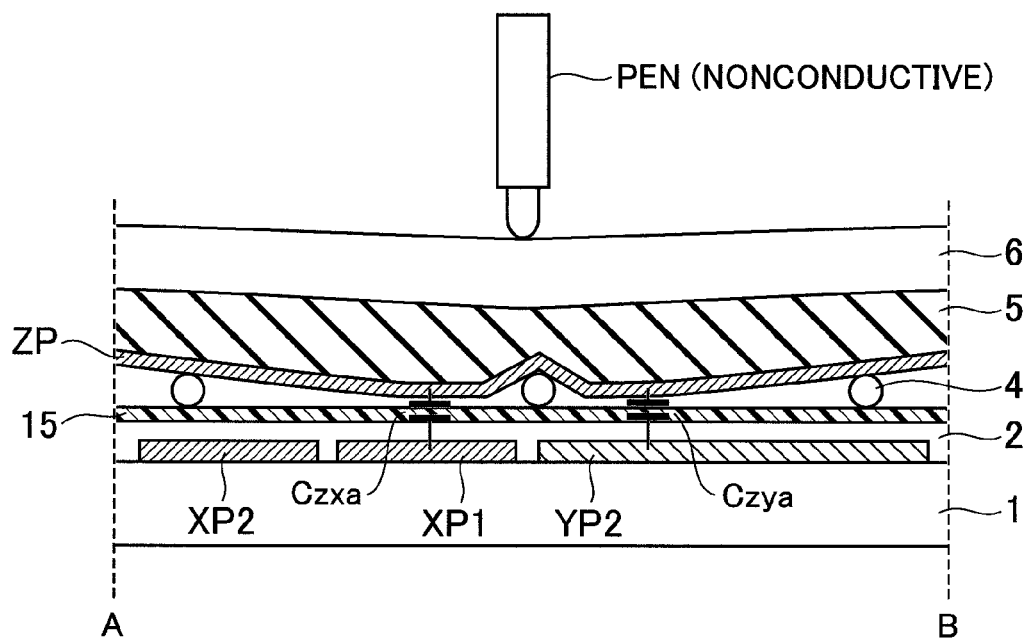
FIG. 22 is a view for illustrating a capacitance change that occurs in the touch panel of the display device according to the seventh embodiment of the present invention when an input is made thereto with a resin pen.

Next, FIG. 22 is a view for illustrating a capacitance change that occurs in the touch panel 101 of the display device according to the seventh embodiment of the present invention when an input is made thereto with a resin pen. In the following, with reference to FIG. 22, a capacitance change that occurs in response to a touch operation made to the touch panel 101 of the display device according to the seventh embodiment of the present invention is described. Here, FIG. 22 is a schematic view, similarly to FIG. 4 of the first embodiment, for illustrating a capacitance change that occurs in a case where nonconductive input means is used for making a touch operation, and a distance from the X electrode XP to the Z electrode ZP and a distance from the Y electrode YP to the Z electrode ZP are changed due to a pressure applied when the touch panel 101 is touched. Further, the following description may similarly be applied to a case where the distance from the X electrode XP to the Z electrode ZP and the distance from the Y electrode YP to the Z electrode ZP are changed due to a pressure applied through conductive input means (such as finger).

As is apparent from FIG. 22, even in a case where a touch operation is made to the touch panel according to the seventh embodiment of the present invention, similarly to the first embodiment of the present invention, the elastic layer 5 is deformed and the distance from the X electrode XP or from the Y electrode YP to the Z electrode ZP is reduced. Accordingly, the capacitance change expressed by Expression (3) of the first embodiment is similarly obtained at this time. As a result, the capacitance detection part 102 becomes capable of detecting a capacitance of each electrode, or a capacitance change that occurs depending on whether or not a touch operation is made as expressed by Expression (3). This allows the arithmetic control part 103 to calculate the coordinates of the input when the touch operation is made, by using, as a signal component, the capacitance of each electrode or the capacitance change obtained by the capacitance detection part 102.

According to the description given above, even when the input is made with nonconductive input means, the input coordinates may be detected based on the capacitance change that occurs when the distance from the X electrode XP to the Z electrode ZP and the distance from the Y electrode YP to the Z electrode ZP are changed due to the pressure applied by the input. That is, the touch panel 101 according to the seventh embodiment may be configured as an input device responsive to a pressure applied by using nonconductive input means.

As described above, in the display device according to the seventh embodiment of the present invention, the second transparent substrate 6, on which the Z electrode ZP is formed, and the first transparent substrate 1, on which the X electrode XP and the Y electrode YP are formed in the same layer, are disposed to be opposed to each other across the spacers 4, and hence, even when a contact is made onto the touch panel 101 with nonconductive input means, the spacers 4 are capable of significantly deforming the elastic layer 5 under a pressure applied by the contact made to the touch panel 101. As a result, distances from the X electrode XP and from the Y electrode YP for capacitance detection to the Z electrode ZP, the X electrode XP and the Y electrode YP each being disposed to be opposed to the Z electrode ZP may be significantly changed through the elastic layer 5. By changing the distances from the X electrode XP and from the Y electrode YP for capacitance detection to the Z electrode ZP, a large capacitance change may be generated in the capacitance Czx formed by the X electrode XP and the Z electrode ZP and in the capacitance Czy formed by the Y electrode YP and the Z electrode ZP, which allows the touch panel 101 to function as a capacitive coupling type touch panel capable of detecting the input coordinates.

Further, the antireflective film 15 is formed on the opposed surface side of the first transparent substrate 1, and hence reflection at the interface between the air layer, which is formed due to the formation of the spacers 4, and the opposed surface of the first transparent substrate 1 may be significantly reduced. As a result, even in a display device which includes the touch panel 101 disposed on the upper surface of the display panel 106, an image with a high luminance and high contrast may be displayed.

Note that, in the touch panel 101 according to the seventh embodiment, as illustrated in FIG. 20, the thin line portion WR is formed after the X electrode XP and the Y electrode YP are formed in the same layer. However, the present invention is not limited thereto. Alternatively, the thin line portion WR may be formed first, and then the X electrode XP and the Y electrode YP may be formed in the same layer. With this configuration, the distance from the X electrode and the Y electrode to the Z electrode may further be reduced. In other words, there may be obtained a particular effect of increasing the capacitances of Czx and Czy.

Eighth Embodiment

Figure 23:
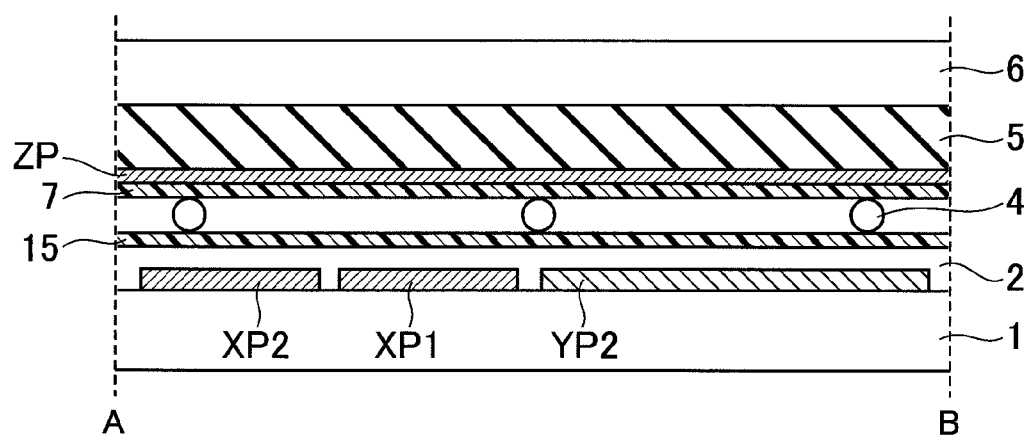
FIG. 23 is a sectional view illustrating an electrode structure of a touch panel of a display device according to an eighth embodiment of the present invention.

FIG. 23 is a sectional view illustrating an electrode structure of a touch panel 101 of a display device according to an eighth embodiment of the present invention. Here, the sectional view illustrated in FIG. 23 corresponds to the sectional view of FIG. 19 of the seventh embodiment. Further, the touch panel 101 according to the eighth embodiment is similar in configuration to the touch panel 101 according to the seventh embodiment, except for the configuration of the antireflective film formed on the second transparent substrate 6 side. Accordingly, the eighth embodiment is similar to the seventh embodiment, that is similar to the first embodiment in terms of material and property of each layer. In the following, the configuration of the antireflective film 7 is described in detail. Note that, the display panel 106 and the touch panel 101 are laminated in a manner similar to that of the first embodiment.

As is apparent from FIG. 23, in the touch panel 101 according to the eighth embodiment, the X electrodes XP, the thin line portion of the X electrode XP, and the Y electrode YP, which are each formed of a transparent conductive film, are formed on the first transparent substrate 1. The thin line portion WR of the Y electrode YP is formed, similarly to the seventh embodiment, as an upper layer on the first insulating film 2 laminated on the X electrode XP, the thin line portion of the X electrode XP, and the Y electrode YP. At this time, the first insulating film 2 is patterned so that the Y electrodes YP and the thin line portion WR are electrically connected to each other. Even in the eighth embodiment, the thin line portion WR is similar in configuration to that of the seventh embodiment, and hence the thin line portion of the X electrode XP may be formed as a thin line portion WR which is formed of a thin film layer different from that forming the X electrodes XP and the Y electrodes YP, and the thin line portion of the Y electrodes YP may be formed of the same layer as that forming the X electrodes XP (pad portions) and the Y electrodes YP (pad portions).

Further, the antireflective film 15 is formed as an upper layer on the first insulating film 2 and the thin line portion WR. The spacers 4 are formed between the antireflective film 15 and the antireflective film 7 at predetermined intervals. On the antireflective film 7, the Z electrode ZP and the elastic layer 5 are laminated, and the second transparent substrate 6 is further laminated thereon, to thereby form the touch panel 101.

As described above, even in the touch panel 101 according to the eighth embodiment, the first transparent substrate 1 and the second transparent substrate 6 are disposed to be opposed to each other across the spacers 4. At this time, on the opposed surface side of the first transparent substrate 1, the X electrode (transparent conductive film) XP and the Y electrode (transparent conductive film) YP which are formed in the same layer, the transparent first insulating film 2, and the antireflective film 15 including one or a plurality of layers are sequentially laminated. Further, on the opposed surface side of the second transparent substrate 6, similarly to the first embodiment, the elastic layer 5, the Z electrode ZP, and the antireflective film 7 including one or a plurality of layers are laminated. Accordingly, in the touch panel 101 according to the eighth embodiment, similarly to the seventh embodiment, the antireflective film 15 formed in an uppermost layer with respect to the first transparent substrate 1 is in contact with the spacers 4. Further, similarly to the first embodiment, the antireflective film 7 formed in an uppermost layer with respect to the second transparent substrate 6 is in contact with the spacers 4. At this time, the antireflective films 7 and 15 also provide insulation to the thin line portion WR and the Z electrode ZP while increasing the flaw resistance thereof, respectively.

As described above, the touch panel 101 according to the eighth embodiment includes the antireflective films 7 and 15 which are formed for alleviating reflected light generated between the interface between the air layer and the first insulating film 2 and the interface between the air layer and the Z electrode ZP. In other words, the second transparent substrate 6 in the touch panel 101 according to the first embodiment and the first transparent substrate 1 in the touch panel 101 according to the seventh embodiment are disposed to be opposed to each other across the spacers 4, and hence, in the touch panel 101 according to the eighth embodiment, in addition to the effect of the first embodiment, the effect of the seventh embodiment is also obtained. Accordingly, with the configuration of the touch panel 101 according to the eighth embodiment, the touch panel 101 may be increased in transmittance, to thereby attain a display of high luminance. Further, external light reflection in the touch panel 101 may be significantly alleviated, and hence there may be produced a particular effect of attaining a display of high contrast.

Figure 24:
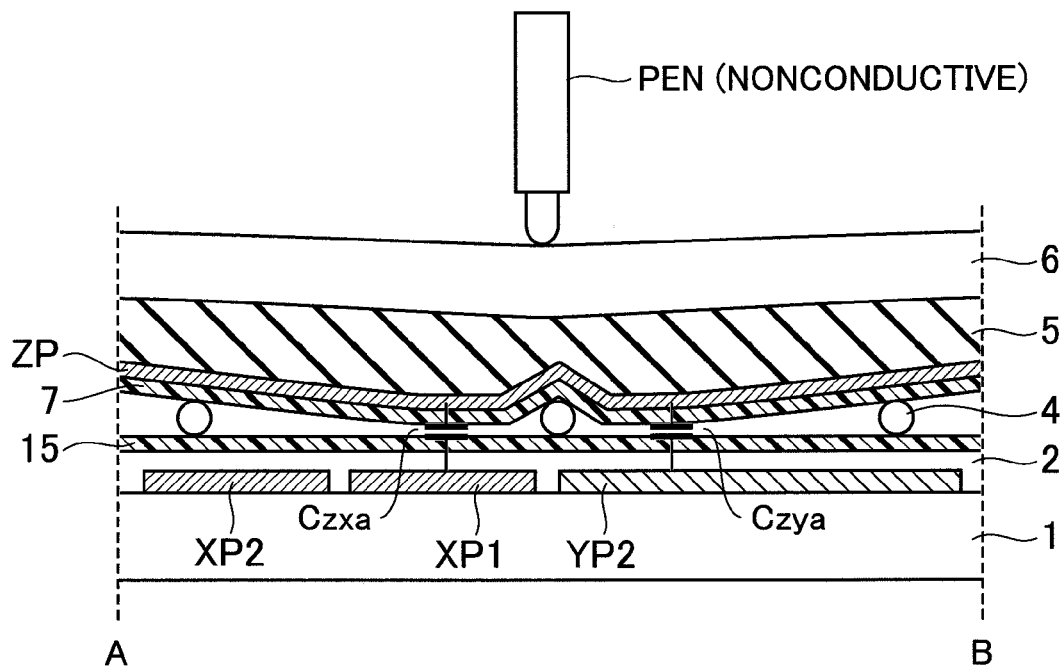
FIG. 24 is a view for illustrating a capacitance change that occurs in the touch panel of the display device according to the eighth embodiment of the present invention when an input is made thereto with a resin pen.

Next, FIG. 24 is a view for illustrating a capacitance change that occurs in the touch panel 101 of the display device according to the eighth embodiment of the present invention, when an input is made thereto with a resin pen. In the following, with reference to FIG. 24, a capacitance change that occurs in response to a touch operation made to the touch panel 101 of the display device according to the eighth embodiment of the present invention is described. Note that, similarly to FIG. 22 of the seventh embodiment, that is, similarly to FIG. 4 of the first embodiment, FIG. 24 is a schematic view for illustrating a capacitance change that occurs in a case where nonconductive input means is used for making a touch operation, and a distance from the X electrode XP to the Z electrode ZP and a distance from the Y electrode YP to the Z electrode ZP are changed due to a pressure applied when the touch panel 101 is touched. Further, the following description may similarly be applied to a case where the distance from the X electrode XP to the Z electrode ZP and the distance from the Y electrode YP to the Z electrode ZP are changed by a pressure applied through conductive input means (such as finger).

As is apparent from FIG. 24, even in a case where a touch operation is made to the touch panel according to the eighth embodiment of the present invention, similarly to the first embodiment of the present invention, the elastic layer 5 is deformed and the distance from the X electrode XP or from the Y electrode YP to the Z electrode ZP is reduced. Accordingly, the capacitance change expressed by Expression (3) of the first embodiment is similarly obtained at this time. As a result, the capacitance detection part 102 becomes capable of detecting a capacitance of each electrode, or a capacitance change that occurs depending on whether or not a touch operation is made as expressed by Expression (3). This allows the arithmetic control part 103 to calculate the coordinates of the input when the touch operation is made, by using, as a signal component, the capacitance of each electrode or the capacitance change obtained by the capacitance detection part 102.

According to the description given above, even when the input is made with nonconductive input means, the input coordinates may be detected based on the capacitance change that occurs when the distance from the X electrode XP to the Z electrode ZP and the distance from the Y electrode YP to the Z electrode ZP are changed due to the pressure applied by the input. That is, the touch panel 101 according to the eighth embodiment may be configured as an input device responsive to a pressure applied by using nonconductive input means.

As described above, in the display device according to the eighth embodiment of the present invention, the second transparent substrate 6, on which the Z electrode ZP is formed, and the first transparent substrate 1, on which the X electrode XP and the Y electrode YP are formed in the same layer, are disposed to be opposed to each other across the spacers 4, and hence, even when a contact is made onto the touch panel 101 with nonconductive input means, the spacers 4 are capable of significantly deforming the elastic layer 5 under a pressure applied by the contact made to the touch panel 101. As a result, distances from the X electrode XP and from the Y electrode YP for capacitance detection to the Z electrode ZP, the X electrode XP and the Y electrode YP each being disposed to be opposed to the Z electrode ZP may be significantly changed through the elastic layer 5. By changing the distances from the X electrode XP and from the Y electrode YP for capacitance detection to the Z electrode ZP, a large capacitance change may be generated in the capacitance Czx formed by the X electrode XP and the Z electrode ZP and in the capacitance Czy formed by the Y electrode YP and the Z electrode ZP, which allows the touch panel 101 to function as a capacitive coupling type touch panel capable of detecting the input coordinates.

Further, the antireflective film 15 is formed on the opposed surface side of the first transparent substrate 1 while the antireflective film 7 is formed on the opposed surface side of the second transparent substrate 6. Accordingly, reflection at the interface between an air layer, which is formed due to the formation of the spacers 4, and the opposed surface of the first transparent substrate 1, and reflection at the interface between the air layer and the opposed surface of the second transparent surface 6 may be significantly reduced. As a result, even in a display device which includes the touch panel 101 disposed on an upper surface of the display panel 106, an image may be displayed with a high luminance and high contrast.

Note that, in the touch panel 101 according to the eighth embodiment, the thin line portion WR is formed after the X electrode XP and the Y electrode YP are formed in the same layer. However, the present invention is not limited thereto. Alternatively, the thin line portion WR may be formed first, and then the X electrode XP and the Y electrode YP may be formed in the same layer. With this configuration, the distance from the X electrode and the Y electrode to the Z electrode may further be reduced. In other words, there may be obtained a particular effect of increasing the capacitances of Czx and Czy.

Ninth Embodiment

Figure 25:
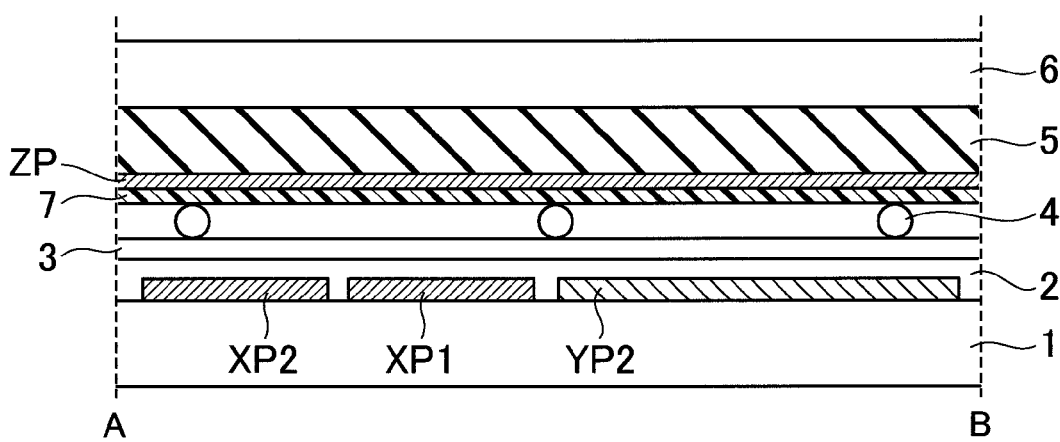
FIG. 25 is a sectional view illustrating an electrode structure of a touch panel of a display device according to a ninth embodiment of the present invention.
Figure 26:
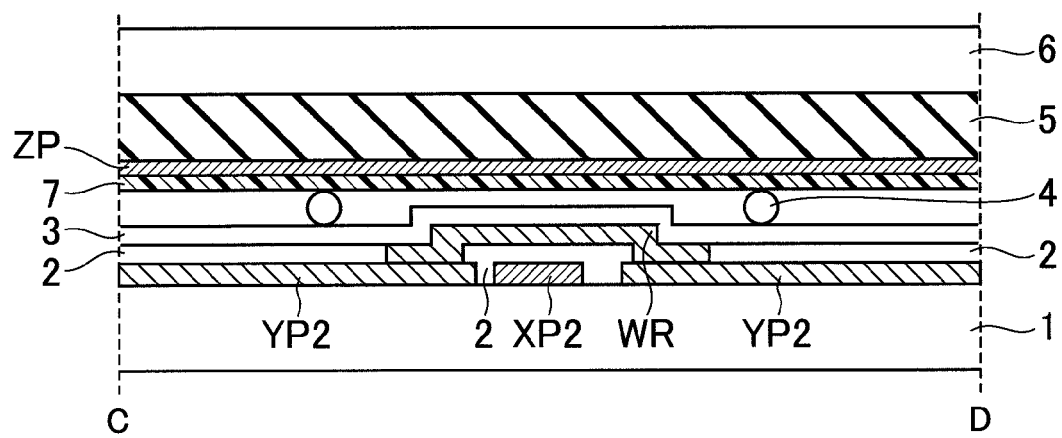
FIG. 26 is a sectional view illustrating a signal line structure for connecting adjacent electrodes of the touch panel of the display device according to the ninth embodiment of the present invention.

FIG. 25 is a sectional view illustrating an electrode structure of a touch panel 101 of a display device according to a ninth embodiment of the present invention and FIG. 26 is a sectional view illustrating a signal line structure for connecting adjacent electrodes of the touch panel 101 of the display device according to the ninth embodiment of the present invention. Here, the sectional view illustrated in FIG. 25 corresponds to the sectional view of FIG. 19 of the seventh embodiment, and the sectional view illustrated in FIG. 26 corresponds to the sectional view of FIG. 20 of the seventh embodiment. Further, the touch panel 101 according to the ninth embodiment is similar in configuration to the seventh embodiment, except for the configuration of the second insulating film 3 formed as an uppermost layer with respect to the first transparent substrate 1. Accordingly, in the following description, the configuration of the second insulating film 3 is described in detail. Note that, the display panel 106 and the touch panel 101 are laminated in a manner similar to that of the first embodiment.

As illustrated in FIGS. 25 and 26, in the touch panel 101 according to the ninth embodiment, the pad portion and the thin line portion of the X electrode XP and the pad portion of the Y electrode YP, which are each formed of a transparent conductive film, are formed on the first transparent substrate 1. The thin line portion WR of the Y electrode YP is formed, as illustrated in FIG. 26, on the first insulating film 2 laminated on the pad portion. At this time, the first insulating film 2 is patterned so that the pad portion of the Y electrode YP and the thin line portion WR are electrically connected to each other. On the first insulating film 2 and the thin line portion WR, the second insulating film 3 is formed. The spacers 4 are formed between the second insulating film 3 and the antireflective film 7 at predetermined intervals. On the antireflective film 7, the Z electrode ZP and the elastic layer 5 are laminated, and the second transparent substrate 6 is further laminated thereon, to thereby form the touch panel 101. Note that, even in the ninth embodiment, the thin line portion WR is similar in configuration to that of the seventh embodiment, and hence the thin line portion of the X electrode XP may be formed as the thin line portion WR formed of a thin film layer different from that forming the X electrodes XP and the Y electrodes YP, and the thin line portion of the Y electrode YP may be formed in the same layer forming the X electrodes XP (pad portion) and the Y electrodes YP (pad portion).

In other words, also in the touch panel 101 according to the ninth embodiment, the first transparent substrate 1 and the second transparent substrate 6 are disposed to be opposed to each other across the spacers 4. At this time, on the opposed surface side of the first transparent substrate 1, the X electrode (transparent conductive film) XP and the Y electrode (transparent conductive film) YP, which are formed in the same layer, the transparent first insulating film 2, the transparent conductive film for forming the thin line portion WR, and the transparent second insulating film 3 are sequentially laminated. Further, similarly to the first embodiment, on the opposed surface side of the second transparent substrate 6, the elastic layer 5, the Z electrode ZP, and the antireflective film 7 including one or a plurality of layers are formed. Accordingly, in the touch panel 101 according to the ninth embodiment, on the first transparent substrate 1 side, the second insulating film 3 formed as an uppermost layer is in contact with the spacers 4. Further, on the second transparent substrate 6 side, similarly to the first embodiment, the antireflective film 7 formed as an uppermost layer is in contact with the spacers 4. At this time, in the touch panel 101 according to the ninth embodiment, the second insulating film 3 is formed for providing insulation to the thin line portion WR while increasing the flaw resistance thereof.

As described above, the touch panel 101 according to the ninth embodiment includes, similarly to the first embodiment, the antireflective film 7 which is formed at the interface between the air layer and the Z electrode ZP formed on the second transparent substrate 6, and hence light reflected off the interface may be reduced. With this configuration, the touch panel 101 may be increased in transmittance, and hence an image from the display panel 106 may be displayed with a high luminance. Further, reflected light in the touch panel 101 may be reduced, and hence, even in a display device which includes the touch panel 101 disposed on the display panel 106, a display of high contrast may be attained. Further, the thin line portion WR may be insulated and improved in flaw resistance.

Figure 27:
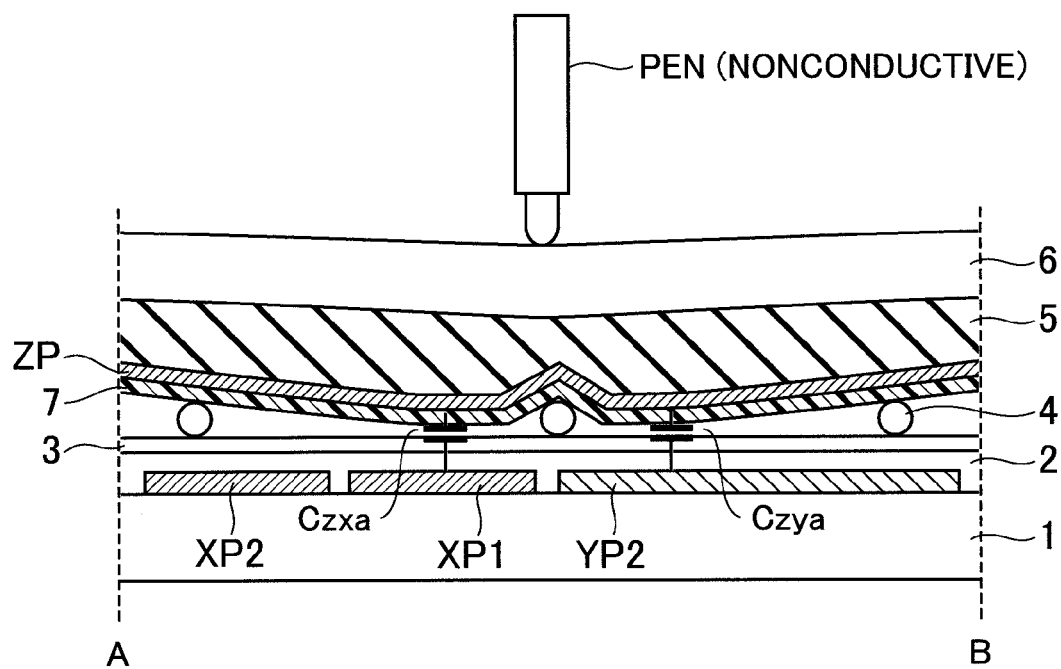
FIG. 27 is a view for illustrating a capacitance change that occurs in the touch panel of the display device according to the ninth embodiment of the present invention when an input is made thereto with a resin pen.

Next, FIG. 27 is a view for illustrating a capacitance change that occurs in the touch panel 101 of the display device according to the ninth embodiment of the present invention when an input is made thereto with a resin pen. In the following, with reference to FIG. 27, a capacitance change that occurs in response to a touch operation made to the touch panel 101 of the display device according to the ninth embodiment of the present invention is described. Here, FIG. 27 is a schematic view, similarly to FIG. 22 of the seventh embodiment, that is, similarly to FIG. 4 of the first embodiment, for illustrating a capacitance change that occurs in a case where nonconductive input means is used for making a touch operation, and a distance from the X electrode XP to the Z electrode ZP and a distance from the Y electrode YP to the Z electrode ZP are changed due to a pressure applied when the touch panel 101 is touched. Further, the following description may similarly be applied to a case where the distance from the X electrode XP to the Z electrode ZP and the distance from the Y electrode YP to the Z electrode ZP are changed due to a pressure applied through conductive input means (such as finger).

As is apparent from FIG. 27, even in a case where a touch operation is made to the touch panel according to the ninth embodiment of the present invention, similarly to the first embodiment of the present invention, the elastic layer 5 is deformed and the distance from the X electrode XP or from the Y electrode YP to the Z electrode ZP is reduced. Accordingly, the capacitance change expressed by Expression (3) of the first embodiment is similarly obtained at this time. As a result, the capacitance detection part 102 becomes capable of detecting a capacitance of each electrode, or a capacitance change that occurs depending on whether or not a touch operation is made as expressed by Expression (3). This allows the arithmetic control part 103 to calculate the coordinates of the input when the touch operation is made, by using, as a signal component, the capacitance of each electrode or the capacitance change obtained by the capacitance detection part 102.

According to the description given above, even when the input is made with nonconductive input means, the input coordinates may be detected based on the capacitance change that occurs when the distance from the X electrode XP to the Z electrode ZP and the distance from the Y electrode YP to the Z electrode ZP are changed due to the pressure applied by the input. That is, the touch panel 101 according to the ninth embodiment may be configured as an input device responsive to a pressure applied by using nonconductive input means.

As described above, in the display device according to the ninth embodiment of the present invention, the second transparent substrate 6, on which the Z electrode ZP is formed, and the first transparent substrate 1, on which the X electrode XP and the Y electrode YP are formed in the same layer, are disposed to be opposed to each other across the spacers 4, and hence, even when a contact is made onto the touch panel 101 with nonconductive input means, the spacers 4 are capable of significantly deforming the elastic layer 5 under a pressure applied by the contact made to the touch panel 101. As a result, distances from the X electrode XP and from the Y electrode YP for capacitance detection to the Z electrode ZP, the X electrode XP and the Y electrode YP each being disposed to be opposed to the Z electrode ZP may be significantly changed through the elastic layer 5. By changing the distances from the X electrode XP and from the Y electrode YP for capacitance detection to the Z electrode ZP, a large capacitance change may be generated in the capacitance Czx formed by the X electrode XP and the Z electrode ZP and in the capacitance Czy formed by the Y electrode YP and the Z electrode ZP, which allows the touch panel 101 to function as a capacitive coupling type touch panel capable of detecting the input coordinates.

Further, the antireflective film 7 is formed on the opposed surface side of the second transparent substrate 6, and hence reflection at the interface between the air layer, which is formed due to the formation of the spacers 4, and the opposed surface of the second transparent substrate 6 may be significantly reduced. As a result, even in a display device which includes the touch panel 101 disposed on the upper surface of the display panel 106, an image with a high luminance and high contrast may be displayed.

Note that, in the touch panel 101 according to the ninth embodiment, the thin line portion WR is formed after the X electrode XP and the Y electrode YP are formed in the same layer. However, the present invention is not limited thereto. Alternatively, the thin line portion WR may be formed first, and then the X electrode XP and the Y electrode YP may be formed in the same layer. With this configuration, the distance from the X electrode and the Y electrode to the Z electrode may further be reduced. In other words, there may be obtained a particular effect of increasing the capacitances of Czx and Czy.

Note that, in the touch panel in the display device according to the seventh to ninth embodiments, the elastic layer and the Z electrode are formed on the opposed surface side of the second transparent substrate. However, the present invention is not limited thereto, and, similarly to the fourth to sixth embodiments, the elastic layer and/or the Z electrode may be formed on the opposed surface side of the first transparent substrate.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A capacitive touch panel, comprising:
a plurality of coordinate detection electrodes for detecting X-Y position coordinates;
a first substrate including the plurality of coordinate detection electrodes; and
a second substrate disposed to be opposed to the first substrate,
wherein the second substrate includes, on the first substrate side, an elastic layer that is lower in rigidity than the second substrate and a conductive layer having conductivity,
wherein the plurality of coordinate detection electrodes and the conductive layer sandwich a plurality of nonconductive spacers formed at intervals in a plane direction of the first substrate and the second substrate,
wherein the capacitive touch panel further comprises an antireflective layer formed on at least one of an interface between the first substrate and a space defined by the plurality of nonconductive spacers and an interface between the second substrate and the space defined by the plurality of nonconductive spacers; and
wherein the antireflective layer is configured to prevent electrical contact between the coordinate detection electrodes and the conductive layer.

2. The capacitive touch panel according to claim 1, wherein the antireflective layer is made of an insulating material and comprises an antireflective laminated body including at least one high refractive thin film layer and at least one low refractive thin film layer which are alternately laminated.

3. The capacitive touch panel according to claim 1, wherein the conductive layer is formed closer to the first substrate with respect to the elastic layer.

4. The capacitive touch panel according to claim 1, further comprising a nonconductive layer that is higher in rigidity than the elastic layer, the nonconductive layer being formed closer to the first substrate with respect to the elastic layer,
wherein the conductive layer is formed on the first substrate side of the nonconductive layer.

5. The capacitive touch panel according to claim 1, further comprising a nonconductive layer that is higher in rigidity than the elastic layer, the nonconductive layer being formed closer to the first substrate with respect to the elastic layer,
wherein the conductive layer is formed between the elastic layer and the nonconductive layer.

6. The capacitive touch panel according to claim 1,
wherein the antireflective layer is configured without holes therethrough and is formed closer to the second substrate with respect to the plurality of coordinate detection electrodes, and
wherein the antireflective layer is formed in a manner that one surface of the antireflective layer is in contact with the plurality of nonconductive spacers and another surface of the antireflective layer is in contact with the plurality of coordinate detection electrodes.

7. A capacitive touch panel, comprising a first substrate and a second substrate which are disposed to be opposed to each other across a plurality of nonconductive spacers,
wherein the first substrate includes:
first signal lines each extending in a direction of a y-axis and being arranged in parallel with one another in a direction of an x-axis;
second signal lines each extending in the direction of the x-axis and being arranged in parallel with one another in the direction of the y-axis;
a first coordinate detection electrode that is formed in an area divided by the first signal lines and the second signal lines, and connected to the one of the first signal lines; and
a second coordinate detection electrode that is formed in the same layer as the first coordinate detection electrode, and connected to the one of the second signal lines,
wherein the first substrate includes an elastic layer that is lower in rigidity than the second substrate and a conductive layer having conductivity, the elastic layer and the conductive layer being formed closer to an opposed surface of the first substrate with respect to the first coordinate detection electrode and the second coordinate detection electrode,
wherein the capacitive touch panel further comprises an antireflective layer formed on at least one of an interface between the first substrate and a space defined by the plurality of nonconductive spacers and an interface between the second substrate and the space defined by the plurality of nonconductive spacers; and
wherein the antireflective layer is configured to prevent electrical contact between the first and second coordinate detection electrodes and the conductive layer.

8. A capacitive touch panel, comprising:
a first substrate;
a coordinate detection electrode for detecting X-Y position coordinates, the coordinate detection electrode being provided on the first substrate; and
a second substrate disposed to be opposed to the first substrate,
wherein the first substrate includes an elastic layer that is lower in rigidity than the second substrate and a conductive layer having conductivity, the elastic layer and the conductive layer being formed closer to the second substrate with respect to the coordinate detection electrode,
wherein the second substrate and the conductive layer sandwich a plurality of nonconductive spacers formed at intervals in a plane direction of the first substrate and the second substrate,
wherein the capacitive touch panel further comprises an antireflective layer formed on at least one of an interface between the first substrate and a space defined by the plurality of nonconductive spacers and an interface between the second substrate and the space defined by the plurality of nonconductive spacers; and
wherein the antireflective layer is configured to prevent electrical contact between the coordinate detection electrode and the conductive layer.

9. The capacitive touch panel according to claim 7, wherein the antireflective film is made of an insulating material and comprises an antireflective laminated body including at least one high refractive thin film layer and at least one low refractive thin film layer which are alternately laminated.

10. The capacitive touch panel according to claim 7, wherein the conductive layer is formed closer to the second substrate with respect to the elastic layer.

11. The capacitive touch panel according to claim 7, further comprising a nonconductive layer that is higher in rigidity than the elastic layer, the nonconductive layer being formed closer to the second substrate with respect to the elastic layer,
wherein the conductive layer is formed on the second substrate side of the nonconductive layer.

12. The capacitive touch panel according to claim 7, further comprising a nonconductive layer that is higher in rigidity than the elastic layer, the nonconductive layer being formed closer to the second substrate with respect to the elastic layer,
wherein the conductive layer is formed between the elastic layer and the nonconductive layer.

13. The capacitive touch panel according to claim 7, wherein the elastic layer and the conductive layer are formed in the same layer.

14. The capacitive touch panel according to claim 7, wherein the elastic layer has a thickness larger than a distance defined by the plurality of nonconductive spacers between the first substrate and the second substrate.

15. The capacitive touch panel according to claim 7, wherein the plurality of nonconductive spacers comprise protrusions formed on at least one of the first substrate and the second substrate.

16. The capacitive touch panel according to claim 7, wherein the plurality of nonconductive spacers are disposed at intervals of equal to or larger than 20 μm and equal to or smaller than 10,000 μm.

17. The capacitive touch panel according to claim 1, wherein the first substrate, the second substrate, the elastic layer, and the conductive layer are transparent.

18. The capacitive touch panel according to claim 8, wherein the antireflective layer is made of an insulating material and comprises an antireflective laminated body including at least one high refractive thin film layer and at least one low refractive thin film layer which are alternately laminated.

19. The capacitive touch panel according to claim 8, wherein the conductive layer is formed closer to the second substrate with respect to the elastic layer.

20. The capacitive touch panel according to claim 8, further comprising a nonconductive layer that is higher in rigidity than the elastic layer, the nonconductive layer being formed closer to the second substrate with respect to the elastic layer,
wherein the conductive layer is formed on the second substrate side of the nonconductive layer.

21. The capacitive touch panel according to claim 8, further comprising a nonconductive layer that is higher in rigidity than the elastic layer, the nonconductive layer being formed closer to the second substrate with respect to the elastic layer,
wherein the conductive layer is formed between the elastic layer and the nonconductive layer.

22. The capacitive touch panel according to claim 8, wherein the elastic layer and the conductive layer are formed in the same layer.

23. The capacitive touch panel according to claim 8, wherein the elastic layer has a thickness larger than a distance defined by the plurality of nonconductive spacers between the first substrate and the second substrate.

24. The capacitive touch panel according to claim 8, wherein the plurality of nonconductive spacers comprise protrusions formed on one of the first substrate and the second substrate.

25. The capacitive touch panel according to claim 8, wherein the plurality of nonconductive spacers are disposed at intervals of equal to or larger than 20 μm and equal to or smaller than 10,000 μm.

26. The capacitive touch panel according to claim 7, wherein the first substrate, the second substrate, the elastic layer, and the conductive layer are transparent.

27. The capacitive touch panel according to claim 8, wherein the first substrate, the second substrate, the elastic layer, and the conductive layer are transparent.

28. A display device, comprising:
 a display panel including a display part; and
 the capacitive touch panel according to claim 1, which is disposed on a display surface side of the display panel.

29. The display device according to claim 28, wherein the capacitive touch panel comprises an antireflective layer formed on at least one of surfaces of the first substrate and the second substrate which are disposed to be opposed to each other, the surfaces being opposite to surfaces opposed to each other.

30. A display device, comprising:
 a display panel including a display part; and
 the capacitive touch panel according to claim 7, which is disposed on a display surface side of the display panel.

31. The display device according to claim 30, wherein the capacitive touch panel comprises an antireflective layer formed on at least one of surfaces of the first substrate and the second substrate which are disposed to be opposed to each other, the surfaces being opposite to surfaces opposed to each other.

32. A display device, comprising:
 a display panel including a display part; and
 the capacitive touch panel according to claim 8, which is disposed on a display surface side of the display panel.

33. The display device according to claim 32, wherein the capacitive touch panel comprises an antireflective layer formed on at least one of surfaces of the first substrate and the second substrate which are disposed to be opposed to each other, the surfaces being opposite to surfaces opposed to each other.

* * * * *